United States Patent [19]

Amikura et al.

[11] Patent Number: 4,876,564
[45] Date of Patent: Oct. 24, 1989

[54] DRIVE DEVICE FOR PHOTOGRAPHIC LENS

[75] Inventors: Takashi Amikura, Tokyo; Akihiro Fujiwara, Kanagawa; Masamichi Toyama, Tokyo; Kouichi Ueda, Kanagawa; Susumu Kozuki, Tokyo, all of Japan

[73] Assignee: Canon Kabushiki Kaisha, Tokyo, Japan

[21] Appl. No.: 289,458

[22] Filed: Dec. 22, 1988

Related U.S. Application Data

[63] Continuation of Ser. No. 195,393, May 13, 1988, abandoned, which is a continuation of Ser. No. 5,782, Jan. 21, 1987, abandoned.

[30] Foreign Application Priority Data

| Jan. 23, 1986 | [JP] | Japan | 61-12835 |
| Jan. 23, 1986 | [JP] | Japan | 61-12836 |
| Jan. 23, 1986 | [JP] | Japan | 61-12837 |

[51] Int. Cl.⁴ .............................................. G03B 3/00
[52] U.S. Cl. .................................. 354/400; 354/195.1; 354/286
[58] Field of Search ................. 354/400, 402, 195.1, 354/286

[56] References Cited

U.S. PATENT DOCUMENTS

| 4,265,528 | 5/1981 | Bestenreiner et al. | 354/400 |
| 4,443,085 | 4/1984 | Tomori et al. | 354/286 |
| 4,483,603 | 11/1984 | Metabi et al. | 354/286 |
| 4,496,229 | 1/1985 | Ogasawara | 354/400 |
| 4,509,841 | 4/1985 | Sakai et al. | 354/402 |
| 4,525,053 | 6/1985 | Shiokama et al. | 354/400 |
| 4,527,879 | 7/1985 | Hosoe et al. | 354/400 |
| 4,537,487 | 8/1985 | Taniguchi et al. | 354/400 |
| 4,538,892 | 9/1985 | Sakai et al. | 354/402 |
| 4,545,664 | 10/1985 | Sakai et al. | 354/400 |
| 4,737,812 | 4/1988 | Hasegawa et al. | 354/400 |

Primary Examiner—Russell E. Adams
Attorney, Agent, or Firm—Fitzpatrick, Cella, Harper & Scinto

[57] ABSTRACT

A lens drive device capable of operating either of a first interchangeable lens barrel having a photographic lens movable relative to the barrel in a prescribed range with switches arranged at the terminal ends of the range so that when movement of the photographic lens reaches the terminal end, a motor driving the focusing lens member is stopped, and a second interchangeable lens barrel having no switches for stopping the focusing lens drive motor, wherein when the first barrel is in use, the lens drive signal is stopped based on the aforesaid switch, and when the second barrel is in use, the aforesaid signal is stopped in a prescribed time measured from the start of rotation of the motor.

11 Claims, 15 Drawing Sheets

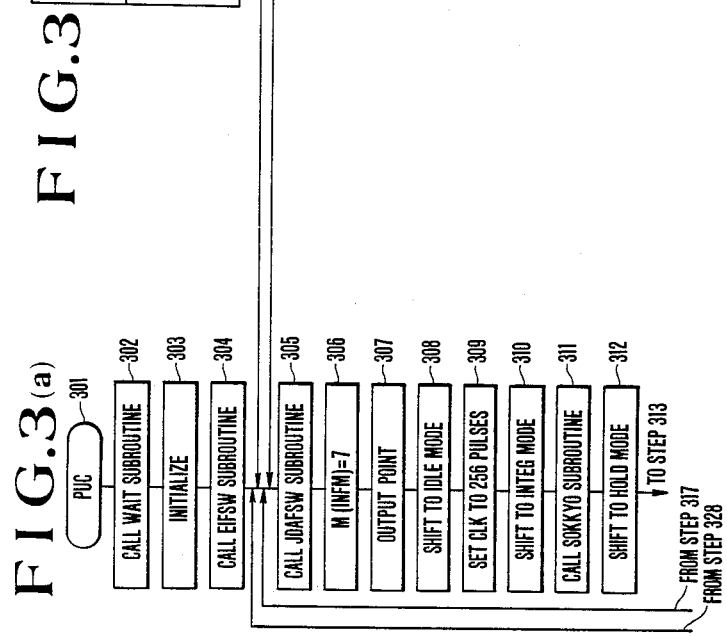

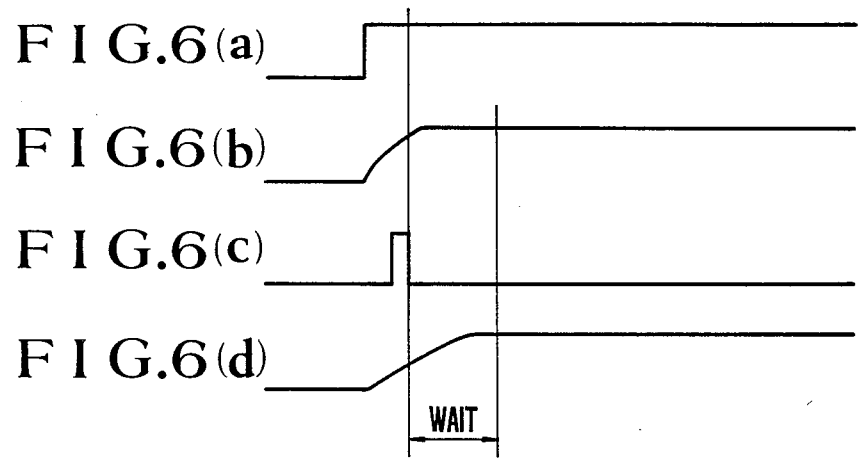
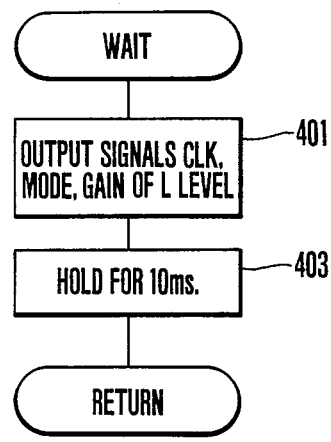

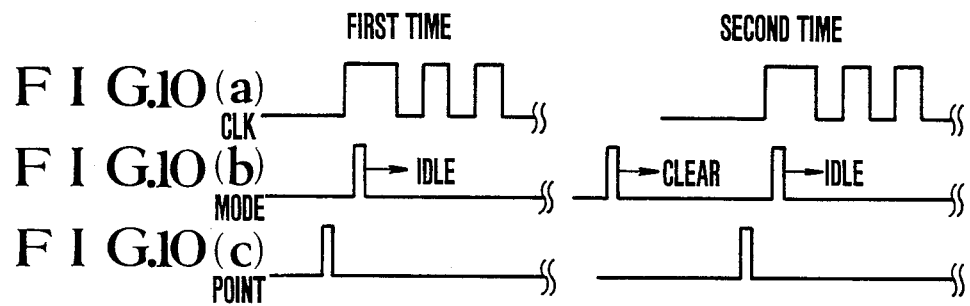
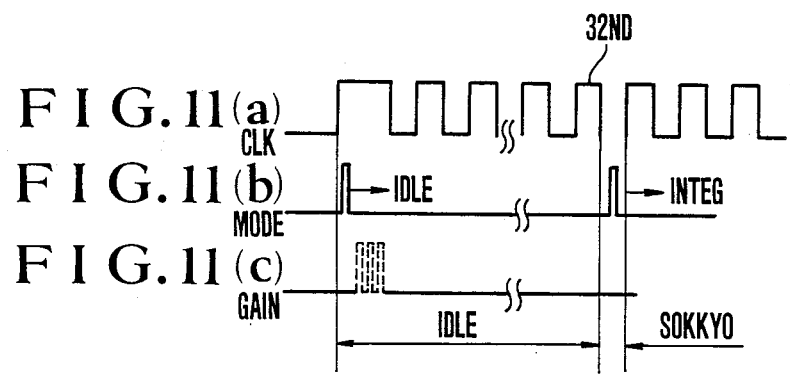

DRIVE DEVICE FOR PHOTOGRAPHIC LENS

This application is a continuation of application Ser. No. 195,393, filed May 13, 1988, now abandoned which is a continuation of Ser. No. 005,782 filed Jan. 21, 1987, now abandoned.

BACKGROUND OF THE INVENTION:

1. Field of the Invention:

This invention relates to photographic apparatus such as video cameras or still cameras, and more particularly to a drive device for the photographic lens.

2. Description of the Related Art:

It is well known that there has recently been developed photographic apparatus having a function of automatically driving the photographic lens, or the auto-focusing function or power zoom function.

In the auto-focusing apparatus, for example, a new mode is provided for measuring not only finite object distances but also infinite one. For the purpose of treating information representing the latter, use is made of a microcomputer.

Meanwhile, getting a camera with such an auto-focusing apparatus, the user who has already had the visual-focus camera with a wide variety of lenses therefor is obliged to buy more lenses of equivalent focal lengths thereto but in mountings of a new type that has a so-called "infinity sensor" switch for detecting whether or not the focusing member has reached that terminal end of movement which focuses the lens at infinity, because, if this switch is absent, the motor as the drive source for the focusing member continues being energized even after the photographic lens has been focused on an infinitely distant object. This will result in too much premature consumption of the battery or serious damage of the control circuit for the motor. Hence, there is a demand for making it possible that the apparatus operates with even the photographic lens in the old mounting having no such "infinity sensor" switch without causing the above described problem when the object distance is at infinity. Though what has been discussed here has been in connection with the focusing, the same will hold even in the case of zooming.

To control the speed of movement of the focusing member or the zoom members, there are two main methods one of which is to vary the voltage applied to the motor, and the other of which is to vary the pulse width or the so-called duty ratio. From the standpoint of minimizing the bulk and size of the apparatus itself, it is desirable to employ the latter method. In the prior art, however, it has been the common practice that the motor control circuit is provided with an additional oscillator or timer circuit solely used for determining the duty ratio, because it is on the basis of its period that determination of the pulse width is made.

SUMMARY OF THE INVENTION:

A first object of the invention is to perform focusing with selection of manners suited to photographic lenses with or without the "infinite sensor" switch.

Another object is to improve the efficiency of speed control of the focusing member of the photographic lens.

In an embodiment of the invention, use is made of the number of recycles of a subroutine of the microcomputer in making a determination of the pulse width.

The main features of the invention lie in the embodiments shown in FIGS. 5, 12 and 20.

These and other objects of the invention will become apparent from the following description of embodiments thereof by reference to the drawings.

BRIEF DESCRIPTION OF THE DRAWINGS:

FIGS. 3, 3(a) and 3(b) are flow charts of the program for the normal mode.

FIGS. 5, 5(a) and 5(b) are flow charts of the program for the infinite mode.

FIGS. 6(a) to 6(d) are waveforms of the outputs at the time of actuation.

FIG. 7 is a flow chart of WAIT subroutine.

FIGS. 10(a) to 10(c) are waveforms of the outputs at the time of start of operation of the system.

FIGS. 11(a) to 11(c) are waveforms of the outputs at the time of changing over between the modes.

FIGS. 15(a) to 17(c) are taken to explain the principle of finding the range.

Figure 1:
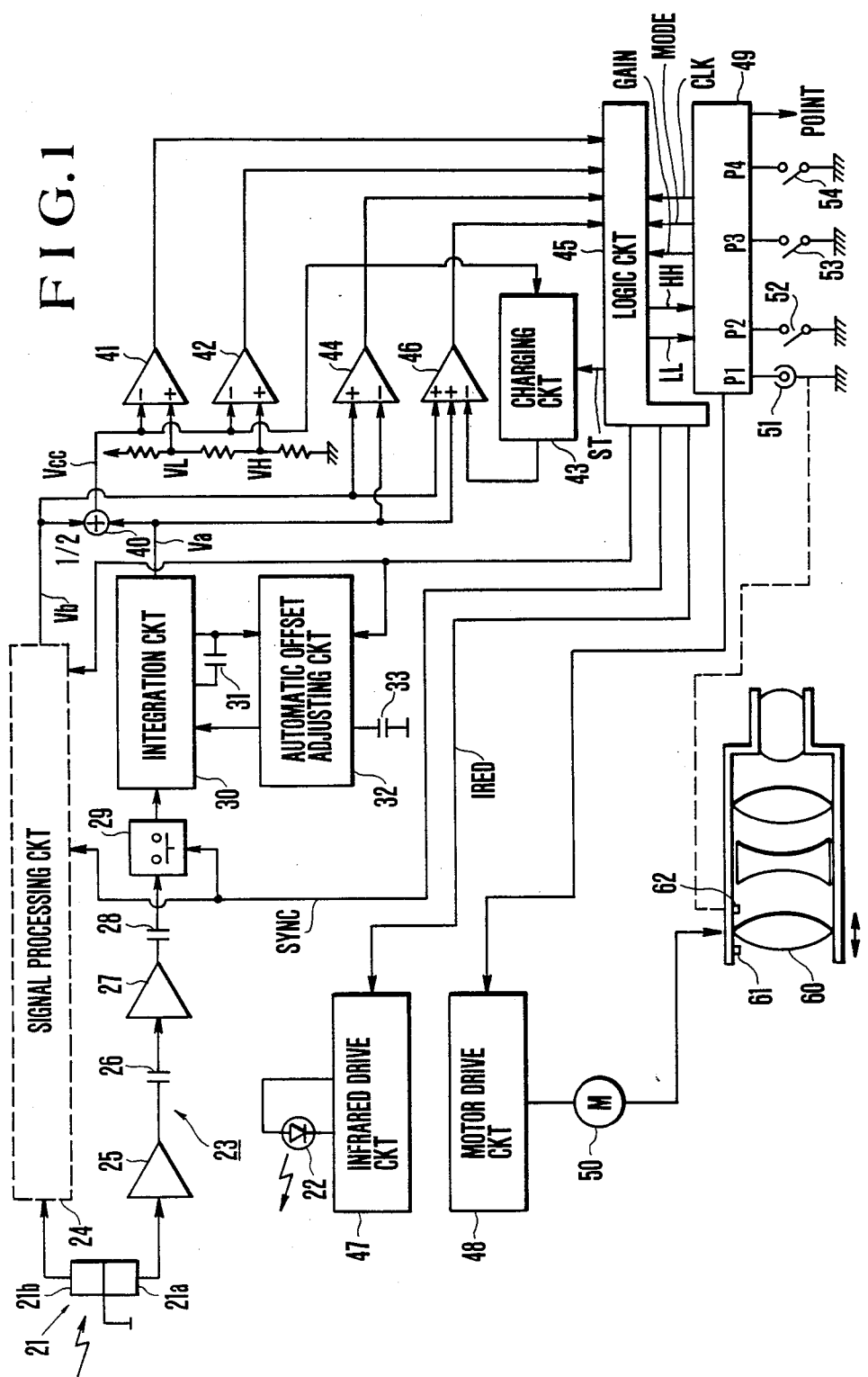
FIG. 1 is an electrical circuit diagram, partly in block form, of a range finding system to which the present invention is related.
Figure 2:
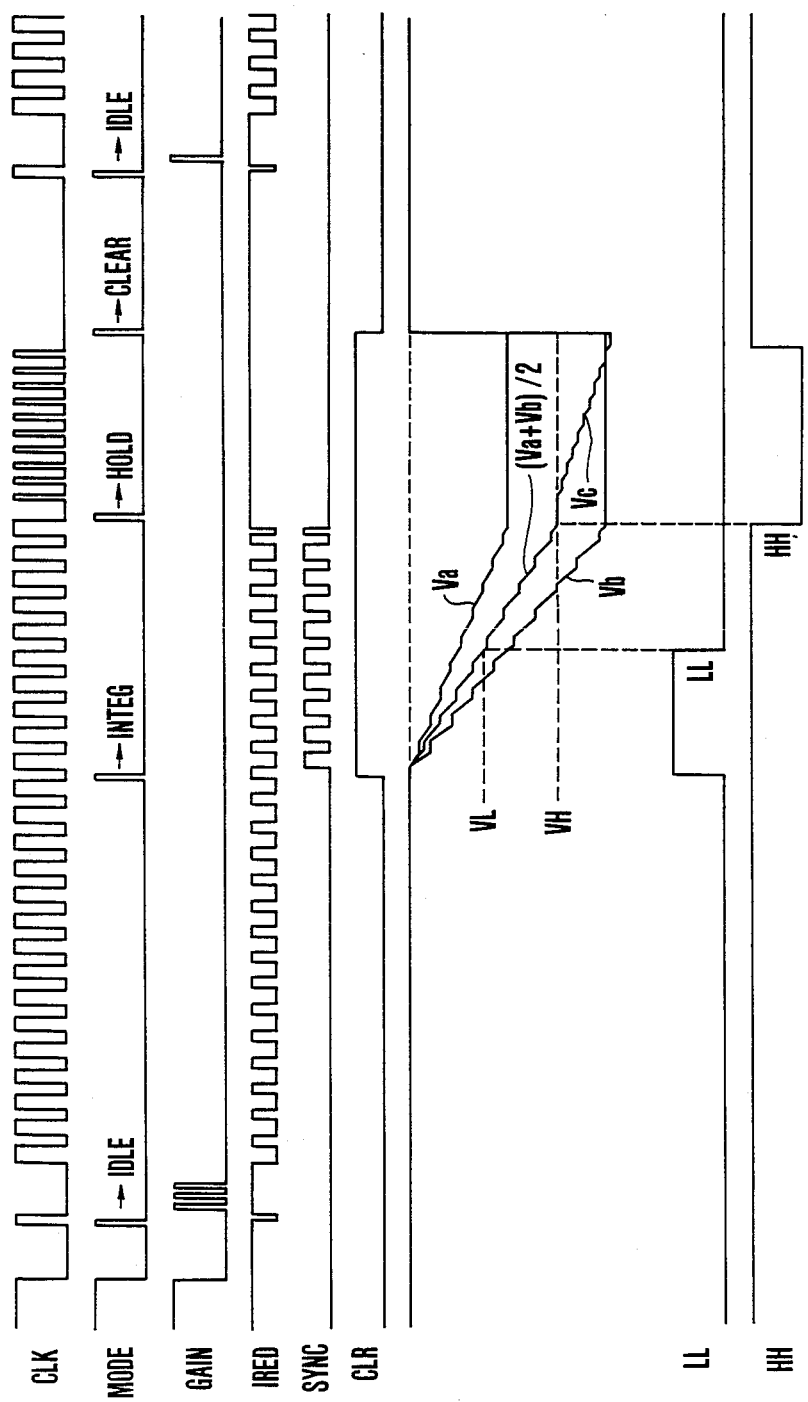
FIG. 2 is waveforms of the control signals appearing in the circuit of FIG. 1.

DETAILED DESCRIPTION OF THE PREFERRED EMBODIMENTS:

The fundamental construction and operation concerning the focus detecting device of the invention is first described based on FIGS. 1 and 2 in its outline.

In FIG. 1, a photo-electric detector 21 for focus detection is constructed in two-divided form with photo-sensitive elements 21a and 21b, and has sensitivity necessary to the wavelength of a light issuing from an infrared light emitting diode 22. The photo-currents are applied to first and second signal processing circuits 23 and 24 respectively. Since the signal processing circuits 23 and 24 are exactly the same, in FIG. 1 only the first one is shown in detail, while the second one 23 is represented by a dashed line block. The output of the photo-sensitive element 21a is applied to a sensor amplifier 25 which produces an output in the form of a voltage proportional to the photo-current of the photosensitive element 21a. Because the sensor amplifier 25 in this position is very susceptible to noise, it is desirable to arrange it as near the photo-electric transducer 21 as possible. Also, because the light incident on the photo-electric transducer 21 includes, beside the infrared component that is useful to detect the range, many unnecessary or foreign components, means should be provided for preventing the output of the sensor amplifier 25 from being saturated with the foreign components. For this purpose, a high pass frequency characteristic may be given, or a circuit for removing the photo-current of the foreign light components may be used, as necessity arises. The output of this sensor amplifier 24, after its direct current component has been cut out by a capacitor 26, is applied to a pre-amplifier 27. This pre-amplifier 27 is able to change its gain in about three values of, for example, 1, 8 and 64 times in order to insure a sufficient dynamic range for the input signals. The output of the pre-amplifier 27 passes through another capacitor 28 to cut out the residual direct current component and therefrom is applied to a synchronous detector circuit 29 at one of two inputs thereof, the other of which is supplied with a train of synchronized pulses SYNC with the pulsated emission of light from the diode 22. Therefore, the detector 29 produces an output representing the potential difference between when the diode 22 is energized and when de-energized, which is applied to an integration circuit 30 where the detected output voltage is integrated and stored on a capacitor 31. Another input of the integration circuit 30 is connected to the output of a circuit 32 for automatically adjusting the offset, so that as the voltage for the offset input of a difference amplifier in the integration circuit 30 is stored on a capacitor 33, the integration circuit 30 operates to reflect a zero input to a zero output. As for the second signal processing circuit 24, the foregoing is just valid. So, its explanation is omitted.

The first and second signal processing circuits 23 and 24 produce outputs Va and Vb from their respective integration circuits 30, which are given to a computer 40 such as that including an adder, where a mean value or (Va+Vb)/2 is obtained. The output of the computer 40 is applied to the minus input terminal of each of two comparators 41 and 42 and a charging circuit 43. The plus input terminals of the comparators 41 and 42 are connected to respective taps VL and VH of a constant voltage divider. The voltages at the taps VL and VH function as threshold levels for use in determining when the integration is complete. A third comparator 44 receptive of the integration outputs Va and Vb at the plus and minus input terminals thereof respectively produces an output representing which output, Va or Vb, is larger. The charging circuit 43 responsive to a step signal ST from a logic circuit 45 increases its output voltage stepwise from the value of (Va+Vb)/2, which is applied to the minus input terminal of a fourth comparator 46 whose plus input terminal is two in number. These two plus input terminals are supplied with the integration outputs Va and Vb respectively. By this comparator 46, the magnitude by which the output Va or Vb is larger than (Va+Vb)/2 can be determined in the form of the number of steps when the comparator 46 inverts its output at the last step. From this number of steps, the potential difference between the integration outputs Va and Vb can be measured.

The logic circuits 45 takes in the signals from the four comparators 41, 42, 44 and 46 and gives signals to the charging circuit 43, the integration circuits 30, the synchronous detector circuit 29, a drive circuit 47 for the infrared light emitting diode 22, and a motor drive circuit 48. Between the logic circuit 45 and a microcomputer 49 there are at least five digital input/output lines. A motor 50 is drivingly connected to a focusing member 60 of a photographic lens in a barrel having two abutments 61 and 62 for defining the respective terminal ends of total focusing movement for the minimum object distance and infinity respectively.

As this automatic focusing method is assumed to be applied to the video camera, for the object distance is changing time after time, there is a need to recycle the focusing adjustment so that the photographic lens is always in sharp focus. For this reason, in the range finding apparatus to which the embodiment of the invention is applied, four different modes referred to as "IDLE", "INTEG", "HOLD" and "CLEAR" are made to operate in sequence, and this sequence is repeated.

The microcomputer 49 sends a clock pulse signal CLK, a mode signal MODE, a gain signal GAIN to the logic circuit 45 in which these signals are combined to form a drive signal IRED for the light-emitting diode 22, a gain changeover signal and others. The CLK signal is used for producing the infrared light drive signal IRED, a synchronizing signal SYNC and the step signal ST for the charging circuit 43. The MODE signal allows the sequence of the four modes IDLE, INTEG, HOLD and CLEAR in this order to take place once for every one cycle of range finding operation. The logic circuit 45 includes two flip-flops FLL and FHH whose outputs are applied through signal lines LL and HH to the microcomputer 49.

FIG. 2 is a timing chart of the various control signals illustrating a manner in which the circuit of FIG. 1 operates. When the CLK and MODE signals become high level for the first time, the signal processing circuits 23 and 24 are reset and the IDLE mode starts to operate. The simultaneous occurrence of change of the CLK and MODE signals to high level takes place only when the range finding operation is recycled beginning with this or IDLE mode. For transition to any other mode, the microcomputer 49 changes the MODE signal alone to high level, leaving the CLK signal at low level. Responsive to the CLK and MODE signals in such combinations of their levels, an AND gate in the logic circuit 45 produces an output which takes the form of one pulse only when the IDLE mode starts to operate. By this pulse, a mode changeover counter in the logic circuit 45 is reset and the IDLE mode is set in. Also, the output signals from the logic circuit 45 to the microcomputer 49 and other circuit elements, namely, LL, HH, SYNC, CLK and IRED, are caused to take their corresponding levels to the IDLE mode. After that, each time the mode signal is pulsated, the mode changeover output signal in the logic circuit 45 advances one step, transiting the mode. In this or IDLE mode, the synchronous detector circuit 29 and the integration circuits 30 produce no outputs. The infrared light drive circuit 47 is actuated by the IRED signal in synchronism with the pulse of the signal CKL. During this mode, the various portions of the circuit are stabilized. That is, the signal GAIN alters the gain of the pre-amplifier 27 to progressively lower values from the maximum one which occurred when the signal processing circuits 23 and 24 were reset, each time the GAIN signal pulsates. Also, the automatic offset adjustment of the integration circuits 30 by the circuit 32 and stabilization of the output of the infrared light source are achieved.

Then, when the next pulse of the MODE signal is produced, the mode transits to INTEG. In this mode, the integration circuits 30 start to integrate and the synchronous detector circuit 29 responsive to the SYNC signal in synchronism with the infrared light drive signal IRED performs synchronous detection of the photosignal from the light receiving element 21a. In the integration circuit 30, when there is a synchronized input from the circuit 29 with the SYNC signal, integration takes place. The integration outputs Va and Vb decrease at a speed proportional to the intensity of the output signal from the synchronous detector circuit 29.

The output of the computer 40 representing the mean value of the outputs of the first and second signal processing circuits 23 and 24, or (Va+Vb)/2 is compared with either of the two threshold levels VL and VH by the comparators 41 and 42 respectively. When (Va+Vb)/2 reaches the threshold value VL or VH, the following change occurs. That is, as the outputs of the flip-flops FLL and FHH (not shown) in the logic circuit 45 have high level from the time of resetting them, when (Va+Vb)/2 crosses the threshold level VL or VH, the output of the flip-flop FLL or FHH is changed to L level by the change of the output of the comparator 41 or 42 respectively. The output of the flip-flop FHH always appears on the output line HH, and the output of the flip-flop FLL appears on the output line LL only when in INTEG mode. Discriminating between such digital signals from the flip-flops FHH and FLL, the microcomputer 49 can check how far the integration has progressed by means of the two threshold values VL and VH. The reach to the threshold value VH determines the termination of the integrating operation, or the end of INTEG mode. For note, the flip-flop FHH, regardless of whether or not (Va+Vb)/2 reaches the threshold level VH, automatically changes to L level when INTEG mode transits to HOLD mode. The other threshold level VL plays its role when the blind zone is altered in order to stabilize the focusing operation.

Then, by the third pulse of the MODE signal, HOLD mode starts to operate. In this mode, while the integration circuits 30 continues to be able to integrate, the synchronous detector circuit 29 and the infrared light drive circuit 47 are rendered inoperative. It is in this mode that the values of the integration outputs Va and Vb of the first and second signal processing circuits 23 and 24 are held, and the difference between one of them and the mean value of (Va+Vb)/2 is detected. Also, the signal CLK changes its frequency, contributing to formation of the step signal ST. The output of the charging circuit 43 when in the preceding or INTEG mode was equal to the mean value of the integration outputs Va and Vb or (Va+Vb)/2, because the output of the computer 40 was placed onto the output line of the charging circuit 43. In this or HOLD mode, however, as the charging is being carried out by the step signal ST of constant electrical power with a constant period, the output of the charging circuit 43 decreases at a constant speed as shown by a line Vc in FIG. 2. In due time, it comes to cross whichever of the integration output Va or Vb is lower in voltage. At this time, the flip-flop FHH returns to H level again. For this change is placed onto the output line HH, it is possible to evaluate the difference between the potentials of the integration outputs Va and Vb by measuring the time interval for which the output of the flip-flop FHH has been maintained at L level. From this potential difference of the integration outputs Va and Vb, the focus state can be determined. The smaller this difference, the nearer the focusing member lies to the in-focus condition. For note, in this case, the charging in the charging circuit 43 can also be regarded as discharging in view of the choice of sign.

Further, when the fourth pulse of MODE signal is produced, HOLD mode transits to CLEAR mode. In this mode, similarly to IDLE mode, the synchronous detector circuit 29 and the integration circuits 30 no longer produce the outputs, thus being initialized. No infrared light, too, is issued. The relation of the values of the integration outputs Va and Vb is latched until HOLD mode in the next cycle operates, determining the direction in which the motor 50 rotates through the motor drive circuit 48 to bring the photographic lens to a sharper focus position. For note, this relation is obtained in the form of the sign of the output of the comparator 44.

In such a manner, when in changing over the mode, by producing the MODE signal, the changing over of the mode is performed. To discriminate what mode is in operation at the present time, only when to change over to IDLE mode, CLK signal is made to become H level in synchronism with MODE signal. Therefore, discrimination of IDLE mode can be recognized by examining whether or not CLK signal is H level at a time when MODE signal has become H level. This leads to allow for the other modes to be discriminated by counting the number of produced pulses of MODE signal from IDLE mode as the start point.

The basic operation of the automatic focusing system according to the invention has been described based on FIGS. 1 and 2. Subsequently, the operation of the microcomputer 49 is here described in great detail by reference to the flow charts of FIGS. 3, 4 and 5.

At first, when current is applied to the automatic focusing circuit as shown in FIG. 6(a), the voltage of an electrical power source or battery is applied to the microcomputer 49 as shown in FIG. 6(b). In a step 301 of FIG. 3, a power-up clear is effected as shown in FIG. 6(c), resetting the microcomputer 49. Then, it starts to operate according to the program.

In the next step 302, WAIT subroutine of FIG. 7 is called out. In steps 401 and 402, the battery voltage of the analog circuit rises up fully and is stabilized completely in a time denoted by WAIT in FIG. 6(d). This time is predetermined to be, for example, 10 ms for which the potentials at the inputs of the analog circuit, or the output signals CLK, MODE and GAIN of the microcomputer 49, are maintained at low level in order to insure that the analog circuit is protected from damage by abnormal current which would otherwise flow thereto. The termination of the period WAIT is followed by a step 303 in which the various memories in the microcomputer 49 are set to their initial state, and the signals CLK, MODE and GAIN are changed to H level. Therefore, the gain of the pre-amplifier 27 takes an initial or maximum value of 64x. This is because if there is need to change over the gain, the integration period is shorter when the range finding is started with the maximum value of the gain of the pre-amplifier 27 than otherwise, for the focus state can be determined in a shorter time.

Figure 8:
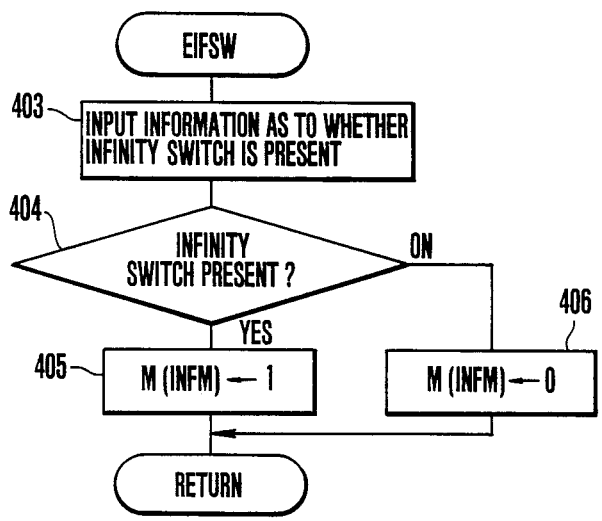
FIG. 8 is a flow chart of EIFSW subroutine.

In the next step 304, EIFSW subroutine shown in FIG. 8 is called out to testify the photographic lens is equipped with the infinity switch 51 shown in FIG. 1. The presence or absence of the infinity switch 51 is given as information to an input terminal $P_1$ of the microcomputer 49 in the form of L or H level respectively. In other words, when the photographic lens has the infinity switch 51, the input terminal $P_1$ is grounded. This information may otherwise be obtained by a hard wire automatically or manually. After the information from the terminal $P_1$ has been taken in an accumulator (hereinafter referred to as "ACC") in a step 403 of FIG. 8, the discrimination between the presence and absence of the infinity switch 51 is carried out in the next step 404 depending on whether the content of ACC is "1" or "0" respectively. Because, in this instance, the information from the terminal $P_1$ is L level, the photographic lens in use is determined to have the infinity switch 51. Hence, a memory M (INFM) is set to "1". If there is no infinity switch 51, the information from the input terminal $P_1$ has H level. "0" representing the absence of the infinity switch 51 is instead set in the memory M.

Figure 5:
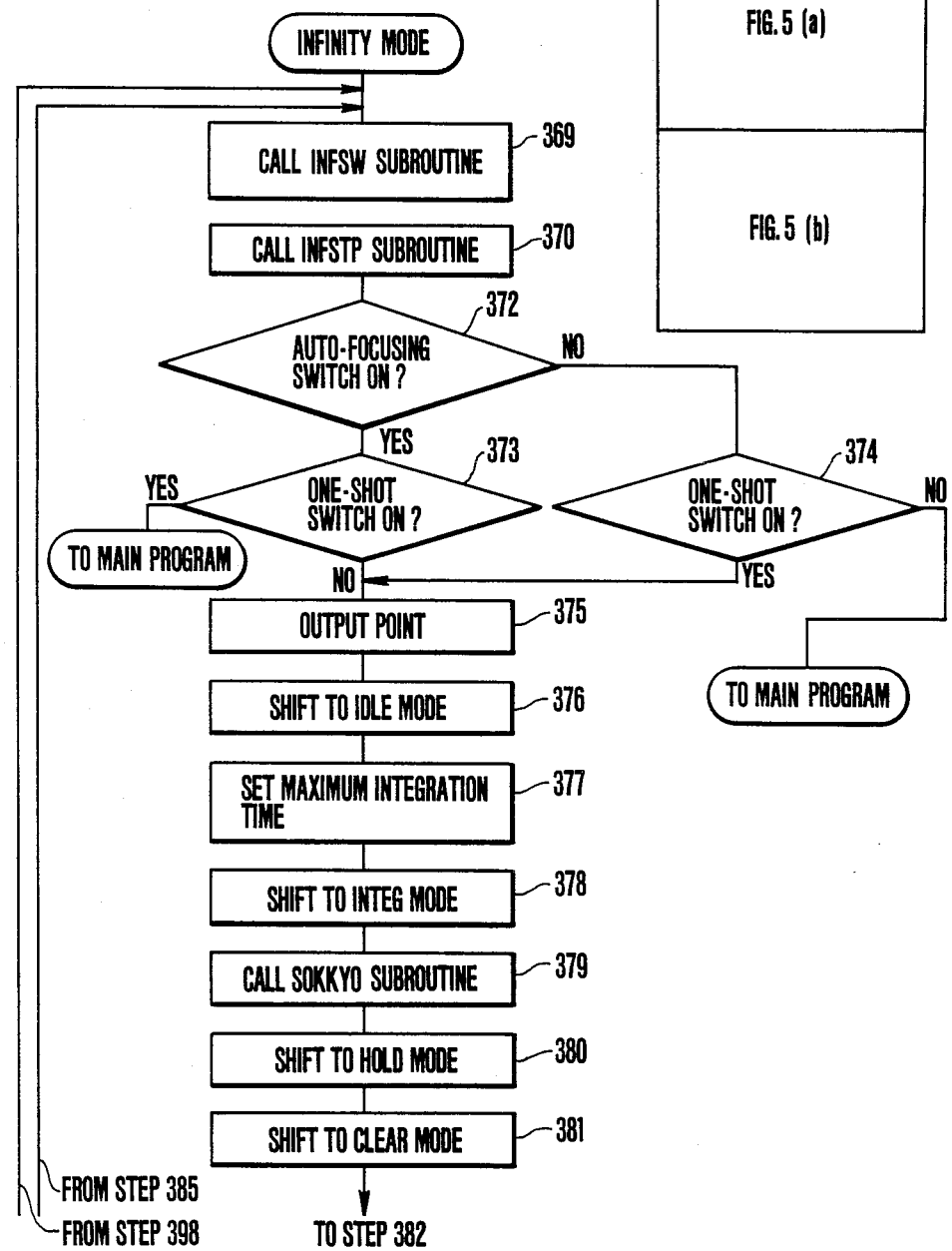
Figure 5:
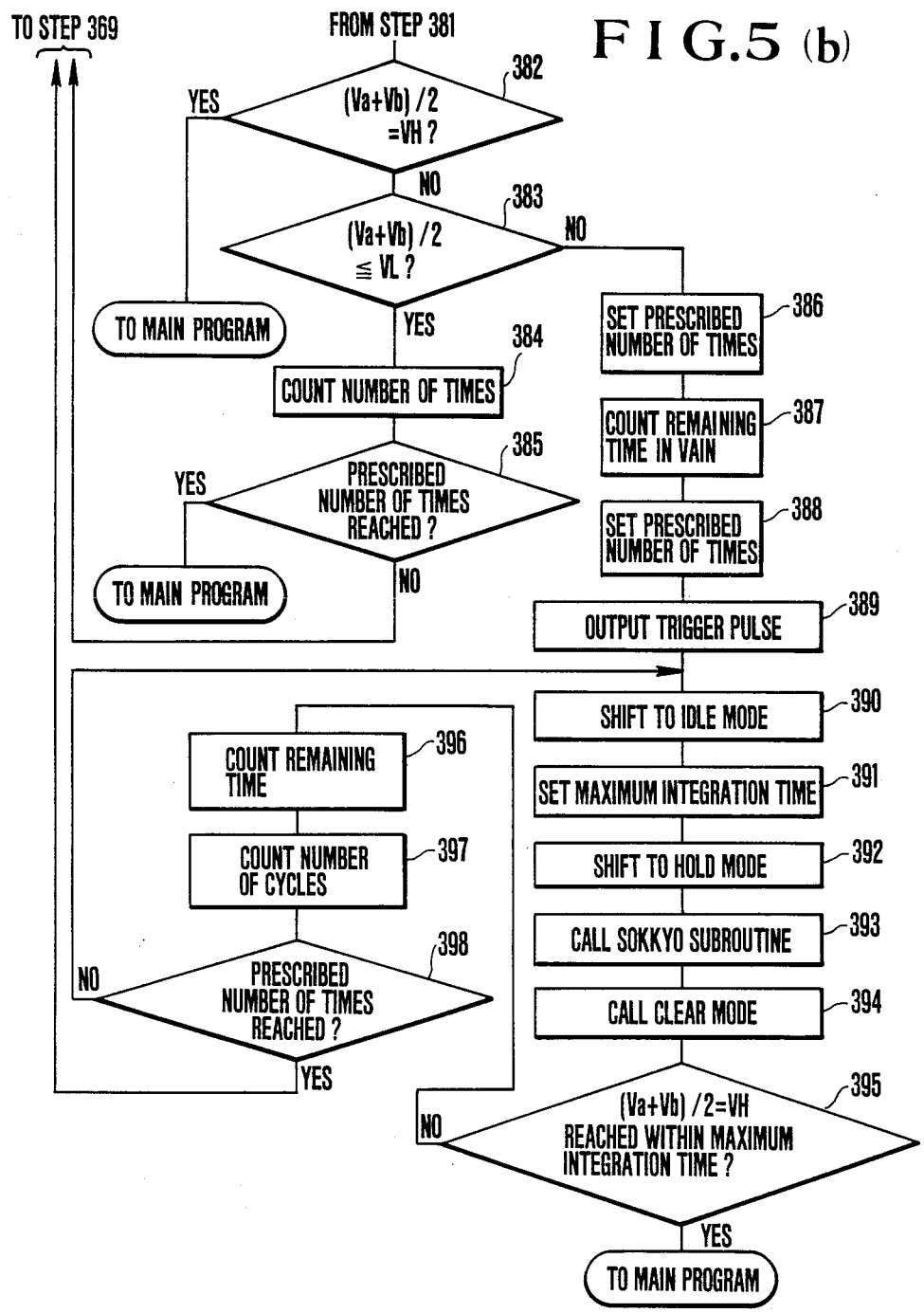

As the level of the integration signal is low representing that an object to be photograph lies farther, when the program of FIG. 5 sets out the infinity mode, this memory M (INFM) is read out to determine the use or disuse of the infinity switch information by "0" or "1". Depending on another information at an input terminal $P_2$, one of the two methods of controlling the motor 50 is then selected. This input terminal $P_2$ is arranged to receive information from a contact 52 of the infinity switch 51. For note, how to operate this infinity mode will be described in greater detail later by reference to FIG. 5.

Figure 9:
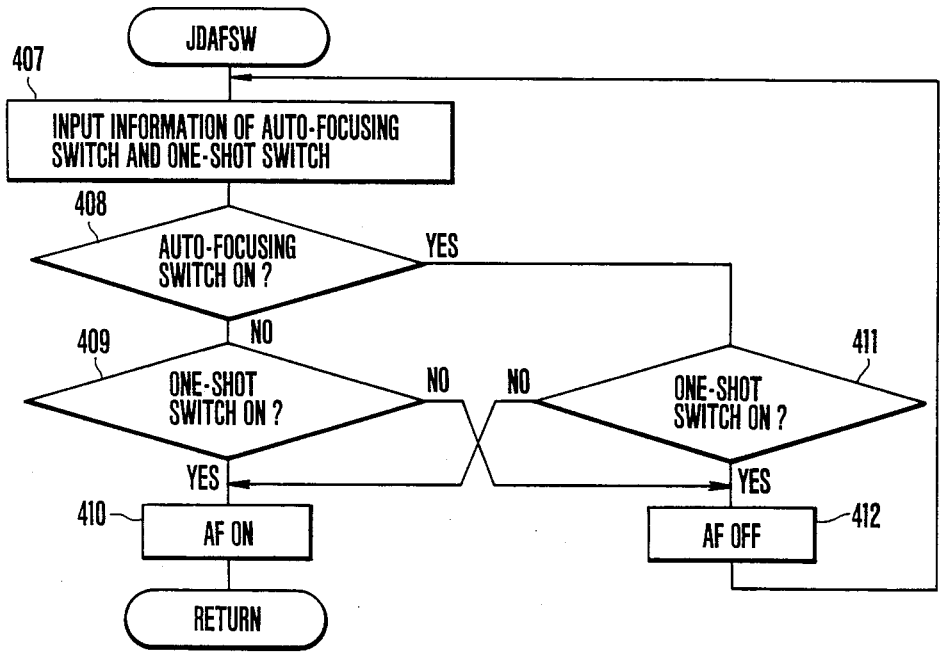
FIG. 9 is a flow chart of JDAFSW subroutine.

Next, in a step 305, JDAFSW subroutine shown in FIG. 9 is called out. This routine is to examine what on-off combination an automatic focusing switch 53 with a slide knob as its actuator and a one-shot switch 54 with a push button as its actuator have by means of input terminals $P_3$ and $P_4$ of the microcomputer 49, and determine whether an automatic focusing is started or stopped. In a first step 407, information to the input terminals $P_3$ and $P_4$ is taken in ACC. In the next step 408, whether the automatic focusing switch 53 is on or off is tested. If on, the next step 409 is executed to test whether the one-shot switch 54 is on or off. If on, the flow advances to the next step 410 where, because the actuation for automatic focusing is on, an operation is started. Alternatively assuming that both switches are off, the flow is branched from the step 409 to a step 412. Hence, the actuation for automatic focusing is off. For another combination of "on" state of the switch 53 and the "off" state of the switch 54, the flow advances from the step 408 past a step 411 to the step 410. Hence, the actuation for automatic focusing is on. To turn on the switch 54 while the switch 53 is on, the flow advances from the step 411 to a step 412. Hence, the actuation for automatic focusing is off. These situations are summarized in Table 1 below.

TABLE 1

| | Automatic Focusing | | | |
|---|---|---|---|---|
| Switch 53 | ON | OFF | OFF | ON |
| One-Shot Switch 54 | ON | ON | OFF | OFF |
| Actuation for Automatic Focusing | OFF | ON | OFF | ON |

By such an algorithm, the actuation for the automatic focusing is controlled by the combination of the ON and OFF states of the automatic focusing switch 53 and the one-shot switch 54. With the automatic focusing switch 53 in ON state, when the one-shot switch 54 is turned on, the automatic focusing operation is terminated. In other words, so long as the actuator or push button for the one-shot switch 54 is being depressed, it functions to lock an initiation of an automatic focusing operation from being actuated even when the automatic focusing switch 53 is in ON state. Also, with the automatic focusing switch 53 in OFF state, when the push button is depressed, an automatic focusing operation is initiated. That is, so long as the push button is being depressed, the automatic focusing operation goes on. This implies that the push button functions to take one shot. When the automatic focusing operation is terminated, the flow returns to the step 407 where information is read out from the automatic focusing switch 53 and one-shot switch 54. Thus, the discrimination between the ON and OFF of automatic focusing continues being recycled.

Suppose here the actuation for automatic focusing is determined to be on, and the flow advances to the next step 306 where an automatic focusing operation starts. In the step 306 of FIG. 3, the memory M (INFM) is set to "7". This determines the number of repetition of the infinity mode, as will be described more fully later in connection with a flow of the infinity mode. At the start of movement of the automatic focusing system, the microcomputer 49 produces a pulse POINT representative of an initiation of a range finding cycle shown in FIG. 10(c). This constitutes a step 307. This pulse POINT, because of its being a pointer indicating the initiation of each cycle of range finding operation, is useful as a trigger for facilitating establishment of a synchronism when waveforms of an oscilloscope are observed or the circuits or substrates are checked by a checker.

In the next step 308, after CLK signal rises to H level as shown in FIG. 11(a), a pulse of MODE signal is produced as shown in FIG. 11(b) to reset the circuit and transit to IDLE mode. As has been described above, it is only when to transit to IDLE mode that MODE signal and CLK signal take H level at the same time. When to transit to any other mode, MODE signal is produced alone. After that, the gain of the pre-amplifier 27 is set to a value based on the result of the preceding cycle by sending GAIN signal as shown in FIG. 11(c). Particularly the offset automatic adjusting circuit 32 is made to function. A CLK signal consisting of 32 pulses is sent to the circuit 32. During this time, the offset of the integration circuit 30 is adjusted. Also, during the period of CLK signal of 32 pulses, the speed of the motor 50 is controlled in accordance with the duty ratio to be described later based on the result of the preceding cycle of range finding operation. In a step 309, before the range finding operation is initiated, the number of pulses of CLK signal necessary to define the possible maximum integration period for the normal range finding mode is set to 256. In a step 310, to transit from IDLE to INTEG mode, one pulse of MODE signal is produced. By this MODE signal, the operation transits to INTEG mode, and CLK signal is released. Thus, the preparation for integration is complete.

Figure 12:
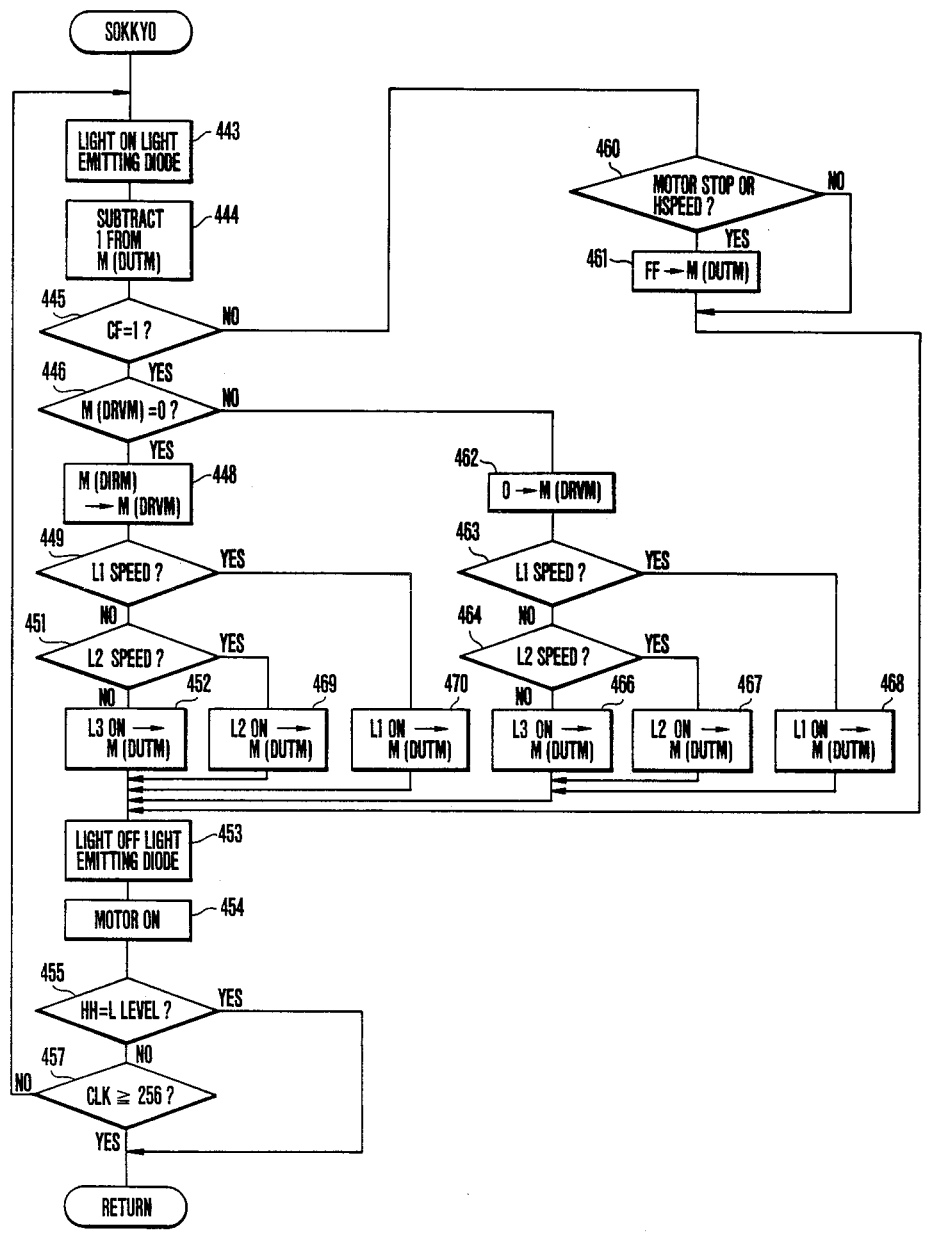
FIG. 12 a flow chart of SOKKYO subroutine.

In a step 311, SOKKYO subroutine shown in FIG. 12 is called out. This subroutine will be more fully described later. Yet, CLK signal is supplied to the analog circuit, and IRED signal actuates the drive circuit for the diode 22, while a synchronous detection and integration is simultaneously performed. Either when the mean value of the outputs Va and Vb of the integration circuits 30 reaches the threshold level VH, or when the integrating period reaches the maximum value, the integrating is stopped. Also, to allow for the mean value of (Va+Vb)/2 to be later used in carrying out range finding in a VL zone where the mean value is compared with the threshold level VL, the number of pulses of CLK signal produced during the time the mean value approaches the threshold level VL is sampled and stored in a memory M (GOTLM). It is to be noted again that even during the integrating period, the speed control of the motor 50 is carried out based on that object distance which was obtained in the preceding cycle of range finding operation.

When the integrating operation terminates, the flow advances to a step 312 where MODE signal once pulsates again and HOLD mode operates. In this mode, the outputs Va and Vb of the integration circuits 30 are held in separation. In the next step 313, whether the termination of the integrating operation is effected when the mean value or $(Va+Vb)/2$ has reached the threshold level VH, or when the maximum integrating period has expired is determined. In the former case, the flow advances to the next step 314 where if the number N of pulses of CLK signal produced until the mean value or $(Va+Vb)/2$ reaches the threshold level VH is smaller than, for example, 16 is tested. If not so, or N is equal to or larger than 16, the gain of the pre-amplifier 27 is determined to have a right value. Then the flow jumps to a step 321 where the direction and speed are discriminated.

In the step 314, if $N<16$, the preset value of the gain of the pre-amplifier is determined to be too high. As a rule, the gain is then decreased one step. This allows the dynamic range of the circuit to become wider in order to insure that a proper range finding can be performed. In more detail, in the embodiment of the invention, the gain varies in three discrete values, and, even for, as the reflection of the object to be photographed is very high and its distance is short, the gain of the pre-amplifier 27 is preset to the minimum value, occurrence of $N<16$ will be even possible. By taking this into account, a loop from the step 315 to a step 321 is necessarily provided so that it is on the basis of the integration signal of this time that determination of the direction in which the focusing member is to be moved and the speed control are made. If $N<16$ despite the preset value of the gain of the pre-amplifier 27 is not minimum, the next step 316 is executed. That is, in the step 316, one pulse of MODE signal is produced to advance the sequence of operations from HOLD to CLEAR mode, where CLK signal is supplied to the integration circuits 30 and the integration capacitors 31 are cleared. Thus, the next cycle of integration is readied. After in the next step 31, the gain has been decreased one step from the present preset value stored in the memory M (GINM) the flow returns to the step 305. And, just before the initiation of the next cycle of range finding operation, the presetting of the gain of the analog circuit is renewed. After the next cycle of range finding operation starts the gain is changed over to the new value in the step 308. It should be pointed out that, for the case of this loop, the direction discrimination and the speed control are carried out with the preset value left unchanged from that in the preceding cycle, but because of $N<16$, the required time is as short as, for example, less than 2 ms. So, in actual practice, there is no problem at all.

Figure 13:
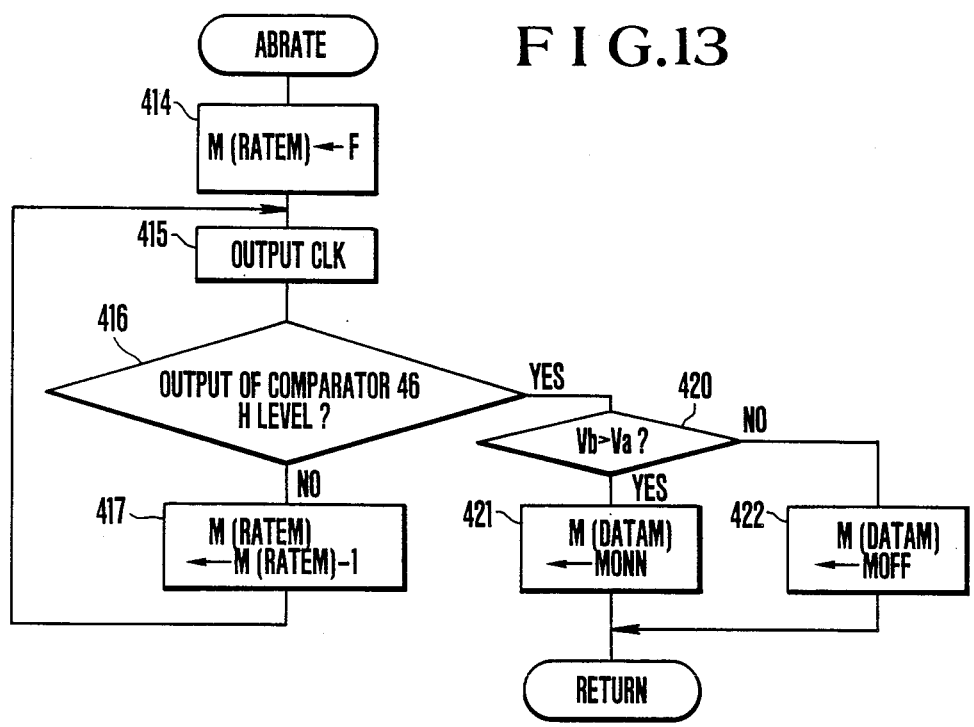
FIG. 13 is a flow chart of ABRATE subroutine.
Figure 14:
FIGS. 14(a) to 14(d) are waveforms at the time of range finding.
Figure 14:
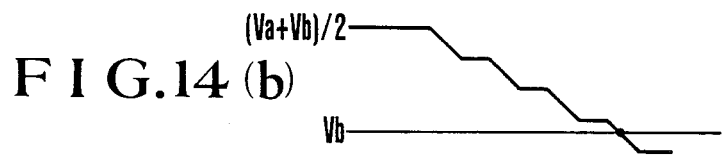
Figure 14:
Figure 14:
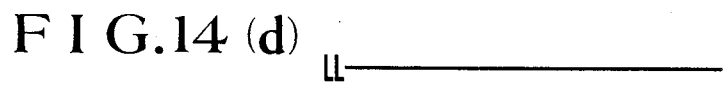

Next, if the integrating time is proper, the step 321 is executed to call out ABRATE subroutine shown in FIG. 13. With this, the difference between the mean value or $(Va+Vb)/2$ and the larger one of the outputs Va and Vb of the integration circuits 30 is evaluated by a discharging method using ST signal. This method should be explained in detail by reference to the waveforms shown in FIGS. 14(a) to 14(d). In the first step 414, F in the hexadecimal number system is put into a memory M (RATEM) for determining the speed of the motor 50. In the next step 415, a train of clock pulses as CLK signal shown in FIG. 14(a) are supplied to the analog circuit. For every one pulse, as this when applied to the charging circuit 43 serves as a step signal ST of constant current, the charge at the output of the computer 40 is discharged one step, thus forming a stepwise discharge signal. So long as the discharge signal is higher than the level Vb, the output of the comparator 46 is left unchanged from L level. Because the output of the comparator 46 when in this or HOLD mode enters the logic circuit 45, it is produced as the output HH of the flip-flop FHH to the microcomputer 49 and then taken in ACC. In the next step 416, if ACC=1 or the output of the comparator 46 is H level is tested. Since, at this time, ACC=0, the flow advances to the next step 417 where the counter memory M (RATEM) is decremented one. Then, it returns to the step 415, for the second pulse as CLK signal is produced.

In FIGS. 14(a) to 14(d), it is assumed that when such a procedure is recycled four times, the stepwise discharge signal falls below the level Vb, the comparator 46 changes its output to H level, which in turn causes the output HH of the flip-flop FHH to change to H level as shown in FIG. 14(c). This information enters the microcomputer 49. Upon determination of the output of the comparator 46 as H level in the step 416, jump to a step 420 occurs where which integration output, Va or Vb, is larger, or which direction the focusing lens is to be moved in based on the discrimination between $Va>Vb$ and $Va<Vb$ is carried out is determined. For this purpose, the integration outputs Va and Vb are applied to the comparator 44 whose output, because of assuming here that $Va>Vb$, takes L level. Therefore, the output LL of the flip-flop FLL is L level as shown in FIG. 14(d). It is now that this signal is being given to the microcomputer 49. In the step 420, therefore, when the output LL is put in ACC, the compared result is taken as $Va>Vb$. So, jump to a step 422 occurs. The information representing the object is farther than the presently focused position, or a toward-infinity signal MOFF, is stored in a memory M (DATAM). For the case of $Va<Vb$, a step 421 is executed to store a toward-minimum object distance signal MONN. Later, depending on the value of the content of the memory M (DATAM), the speed of the motor 50 is adjusted, and depending on the sign of that content, the direction in which the motor 50 is to rotate is determined. This will be described in more detail later in connection with how to control the speed.

As the ABRATE subroutine has operated in such a manner, when the operation terminates, a step 322 is executed where MODE signal pulsates again to cause transition to CLEAR mode. So, the integration circuits 30 in the analog circuit are cleared to make ready for the next integration. In the next step 323, whether or not the preceding cycle of range finding operation has resulted in detection of in-focus or out-of-focus is examined. If so, in order to prevent the automatic focusing system from becoming unstable due to the noise superimposed on the integration signal, the width of the insensitive band is widened. For this purpose, if the out-of-focus state is detected in the preceding cycle, the step 323 is followed by a step 324 where what values the width of insensitive band and the range of speed control should take are determined. If the in-focus state is detected, it is followed by a step 325 where they may take other values.

How to determine these values is here explained. As has been described above, the electrical insensitive band width and speed control range are determined by the potential difference between the means value or $(Va+Vb)/2$ and the smaller one of the integration outputs Va and Vb or the larger one in terms of signal quantity. In this system, that potential difference is replaced by the number of pulses as CLK signal produced in a time interval from the moment at which HOLD mode has been started to the moment at which the output HH of the flip-flop FHH changes from L to H level. The larger the potential difference, or the longer the distance from the in-focus position, the larger the number of pulses. This leads to increase the speed of the motor 50 for automatic focusing. As the in-focus position is progressively nearer, the number of pulses decreases with stepwise decrease of the speed. As it finally enters the insensitive region, the motor 50 is de-energized. In such a manner, the operation of the motor 50 is so smoothly controlled that no overshoot takes place.

For example, as shown in Table 2, for the memory M (RATEM)=0, the speed takes a maximum value H. For $1 \leq M \leq 3$, it slightly slows down to a value $L_l$. For $4 \leq M \leq 6$, it decreases to a slower value $L_2$ than the value $L_1$. For $7 \leq M \leq A$, it further decreases to a slower value $L_3$ than the value $L_2$. When $B \leq M \leq F$, as this range is taken as the insensitive band width, a stop signal is produced. These successive regions of the speed control range, and this insensitive region may otherwise be defined by altering the limits 0 to F in hexadecimal number system according to another program for the microcomputer 49.

TABLE 2

| M(RATEM) | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| Out-Of-Focus | | 0 | | | | $L_3$ | | | $L_2$ | | | $L_1$ | | H |
| In-Focus | | | 0 | | | | $L_3$ | | | $L_2$ | | $L_1$ | | H |

By varying the width of the pulse of CLK signal, it is also possible to alter the insensitive band width and the lengths of the regions of the speed control range despite the number of pulses is the same. Further, by changing the value of a factor of the outside element, for example, the capacitance of the capacitor, the amount of change of the stepwise discharge signal can be changed. Even with this, the insensitive band width can be taken at any desired value. As for the VL zone, too, to be described later, a software can be written so that the required accuracy and stability can be set in by altering the insensitive band width and the lengths of the regions of the speed control range as has been described above.

Figures 15A, 15B, 15C:
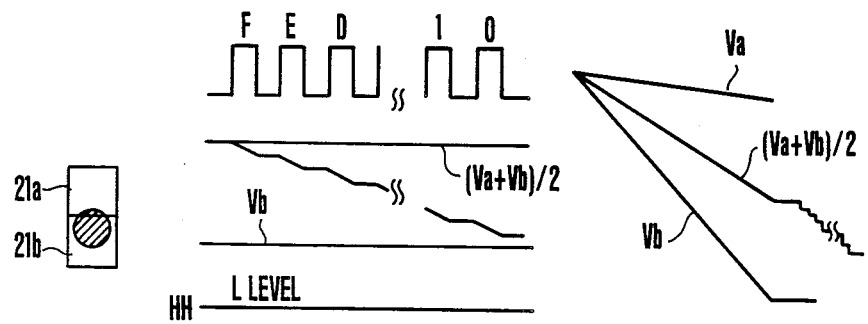

Referring next to FIGS. 15(a) to 17(c), when a light spot of reflection of the infrared light of the diode 11 from the object lies at a very long distance from the boundary between the image receiving areas of the photosensitive elements 21a and 21b, as shown in FIG. 15(a), or when the distance the focusing lens must move to bring the image into focus is very long, the difference between the mean value or $(Va+Vb)/2$ and the value of the integration output Vb is so large that even after however great a number of pulses as CLK signal shown in FIG. 15(b) have been produced, the stepwise discharge signal can never meet the integration output Vb as shown in FIG. 15(c), leaving the output HH of the flip-flop FHH unchanged from L, level. For this case, the content of the memory RATEM becomes M=0. According to the scheme shown in Table 2, this value falls in the high-speed region of the range of speed control for the motor 50.

Figures 16A, 16B, 16C:
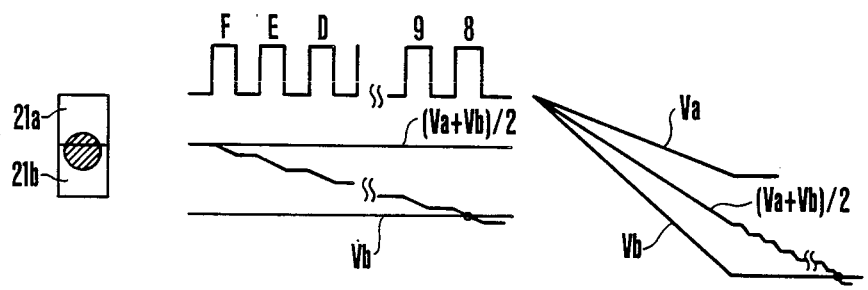

As the motor 50 is rotating to bring the light spot to a position shown in FIG. 16(a), because the distance between the light spot and the boundary is shorter than that of FIG. 15(a), the difference between the mean value of $(Va+Vb)/2$ and the value of the integration output Vb is decreased as shown in FIG. 16(b) to allow the amount of charge to meet the integration output Vb at the time of production of the 8th pulse for M=8. According to the scheme of Table 2, therefore, the rotation of the motor 50 is decelerated to the speed $L_3$.

Figures 17A, 17B, 17C:
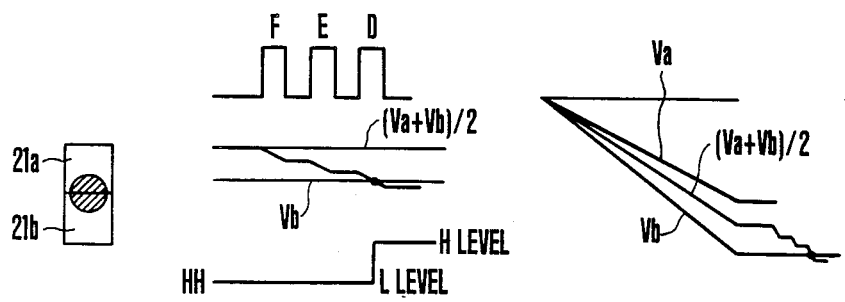

When the in-focus state shown in FIG. 17(a) is reached, the mean value or $(Va+Vb)/2$ and the integration output Vb further approach each other with their difference falling in the insensitive region. This implies that Va=Vb as shown in FIG. 17(c). For this case, when the 3rd pulse of CLK signal is produced, or M=D, the line representing variation of the amount of charge crosses the line representing the integration output Vb, as shown in FIG. 17(b), changing the output HH of the flip-flop FHH to H level. From Table 2, because M=D>B, it falls in the insensitive region. Therefore, the motor 50 stops. In such a way, the speed of the motor 50 and the insensitive band width are adjusted.

Now, with the background of the above-described algorithm that defines the speed and insensitive band width, how, in actual practice, to vary the speed of the motor 50 for automatic focusing is described below. Of the methods using the tacho-generator there are two simple ones, of which the first is to vary the voltage applied on the motor 50, and the second is to vary the duty ratio, while maintaining constant the voltage. In the first method, to realize the four discrete values of speed, H, $L_1$, $L_2$ and $L_3$, the required respective values of voltage are found as VHS, $VL_1$, $VL_2$ and $VL_3$ volts respectively. And, to stop the motor 50, it is taken at 0 volt. Based on the one of the values of speed which has been selected in a manner described above, the voltage applied on the motor 50 is adjusted to the corresponding one of the values. In the second method, on the other hand, instead of the voltage, the required values of the duty ratio are found as A, B, C and D% for the values of speed H, $L_1$, $L_2$ and $L_3$ respectively, and 0% is assigned to the stop. Hence, the duty ratio of the current flowing to the motor 50 is adjusted to the corresponding value to the selected one of the values of speed.

Either method has its merits and demerits. Although the principle of the former is simple, its use results in a drawback that the selection circuit for the values of voltage is of relatively large scale. In the embodiments of the invention, therefore, although the program of the microcomputer 49 becomes somewhat more complicate, the duty ratio control is adopted with an advantage that the peripheral circuits can be simplified in structure. And, the duty ratio is made to vary as execution of a program is recycled.

At first, to all the values of speed H, $L_1$ to $L_3$ and zero are assigned respective numerical values HS, $L_1$ to $L_3$ and STOP for selective storage in a memory M (SPDM). For example, HS=0, $L_1$=1, $L_2$=2, $L_3$=3 and STOP=4. Hence, from the memorized one of the values, what value the present speed of the motor 50 is adjusted to can be determined.

TABLE 3

| | | Time | |
|---|---|---|---|
| Speed | M | On | Off |
| HS | 0 | FF | 0 |

TABLE 3-continued

| Speed | M | Time On | Time Off |
|---|---|---|---|
| $L_1$ | 1 | 33 | 13 |
| $L_2$ | 2 | 23 | 23 |
| $L_3$ | 3 | 15 | 31 |
| STOP | 4 | 0 | FF |

Also, in this embodiment, the basic cycle of the duty ratio control is counted by using one cycle of SOKKYO subroutine, or one cycle of on-off of the light-emitting diode 22 and the memory M (DUTM) and by subtraction. Therefore, what to do is to put a proper value in the memory M (DUTM). Then, for every prescribed number of cycles of SOKKYO subroutine, a carry flag CF can be obtained. By utilizing this carry flag CF, application of the voltage to the motor 50 is made to turn on and off. Thus, the duty ratio can be adjusted to the desired value. Taking an example from Table 3, for the speed $L_i$, the ratio of ON to OFF time is determined to be 33:13. Hence, the motor 50 is energized for 34 cycles, and deenergizered for 14 cycles. That is, the duty ratio is adjusted to 70.8%. Further, since, in this instance, it takes about 120 microseconds to perform one cycle, $120 \times (34 + 14) = 5,760$ microseconds. In other words, the speed control is recycled at a frequency of about 173.6 Hz. In a similar manner, for another speed $L_2$ or $L_3$, the duty ratio is adjusted to 50% or 33.3% respectively. It is of course possible to alter the duty ratio to other desired values by varying the ON/OFF ratio for $L_1$ to $L_3$, and the frequency to another desired value by varying the sum of the numbers of ON and OFF cycles.

A program for the above-described scheme of duty ratio control is next described in connection with the SOKKYO subroutine of FIG. 12. In the first step 443, the light-emitting diode 22 is lighted. Then, in the step 444, 1 is subtracted from the content of a memory M (DUTM). If this leads to production of CF =1 from the memory M (DUTM) in the next step 445, it implies that the motor 50 has to be changed over from ON to OFF or from OFF to ON for the purpose of duty ratio control.

In order to discriminate between ON→OFF and OFF→ON of the motor 50, the content of a memory M (DRVM) is transferred to ACC in a step 446. If the present state of the motor 50 is OFF, the memory M (DRVM) =0. If the motor 50 is being driven, it is 1 or 2. Then, when the execution of the step 446 results in ACC=0, in other words, when the motor 50 is deenergized, necessity arises that the motor 50 be energized. Information representing the direction determined based on the preceding cycle is stored in a memory M (DIRM). So, in a step 448, this is transferred to the memory M (DRVM).

In the next step 449, after the content of the memory M (SPDM) has been transferred to ACC, if the present speed is $L_1$ is tested. When ACC=1, it is determined to be $L_1$. Then a step 470 follows where the $L_1$-ON is stored in the memory M (DUTM). If not, the flow advances to the next step 451 where when ACC=2, the present speed is determined to be $L_2$. Then a step 469 follows where $L_2$-ON is stored in the memory M (DUTM). When ACC is not 2, as it is $L_3$, the flow advances to the next step 452 where $L_3$-ON is stored in the memory M (DUTM).

Then, the light-emitting diode 22 is de-energized in a step 453. In the next step 454, the speed of the motor 50 is adjusted in accordance with the content of the memory M (DRVM). To obtain information representing the mean value or $(Va+Vb)/2$ from the electrical circuit, the next step 455 is executed to read the state of the flip-flop FHH in ACC, where if the mean value or $(Va+Vb)/2$ reaches the threshold level VH, or the output HH of the flip-flop FHH is L level, is tested. If so, as it implies that the integration is complete, the loop of SOKKYO subroutine returns to the main program.

If not, the flow advances to the next step 45 in which when the number of cycles of on-off operation of the light-emitting diode 22, or the number of produced pulses as CLK signal, has reached 256, it also results that the SOKKYO subroutine terminates. As the in-focus condition is not established yet, when that number is less than 256, the flow returns to the first step 443. Thus, the energization of the light-emitting diode 22 is recycled.

If, in the step 446, the motor 50 is determined to be on, jump to a step 462 occurs because of the necessity of de-energizing the motor 50. The subsequent steps 463 to 468 are similar to the steps 449 to 470 respectively.

Jump from the step 445 to a step 460 occurs when it is determined that the motor 50 is no longer necessary to be changed over between ON and OFF. Even in this case, however, there is another necessity of discriminating between when the motor 50 is to be stopped or to run at the highest speed H without the necessity of duty ratio control and when, though the duty ratio is being controlled, the number of cycles does not reaches the level for changeover yet. Because, if, in the step 460, the motor 50 stops or runs at the speed H, ACC=0, for subtraction of 1 from the memory M (DUTM) does not always result in CF=1, the next step is executed to store FF of hexadecimal number system in the memory M (DUTM). In the case of ACC=1, the content of the memory M (DUTM) is subtracted by 1 in the step 444. As the result is stored therein, when CF=1 appears, the changing over of the motor 50 is carried out by the step 446 and those that follow.

The event of such a speed control is not limited to the period of operation of the SOKKYO subroutine. Even in that part of the other of the flow which is substantially similar in the structure of cycles to the SOKKYO subroutine, namely, the period of operation of IDLE mode, a similar control is carried out. A subroutine for IDLE mode is almost similar to that obtained by removing the merit of testing the relationship between the mean value or $(Va+Vb)/2$ and the threshold level VH from SOKKYO subroutine.

Figure 3B:
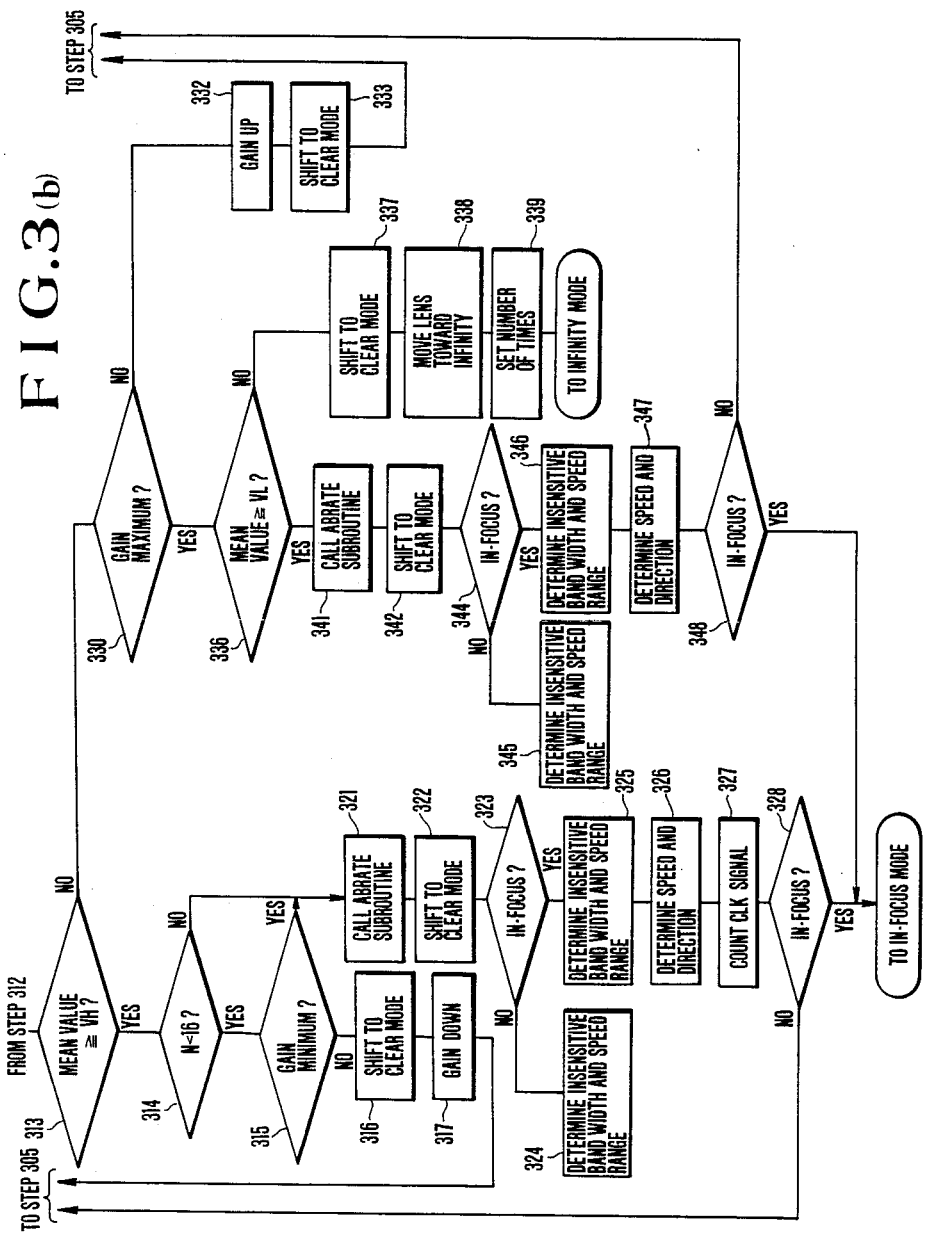
Figure 4:
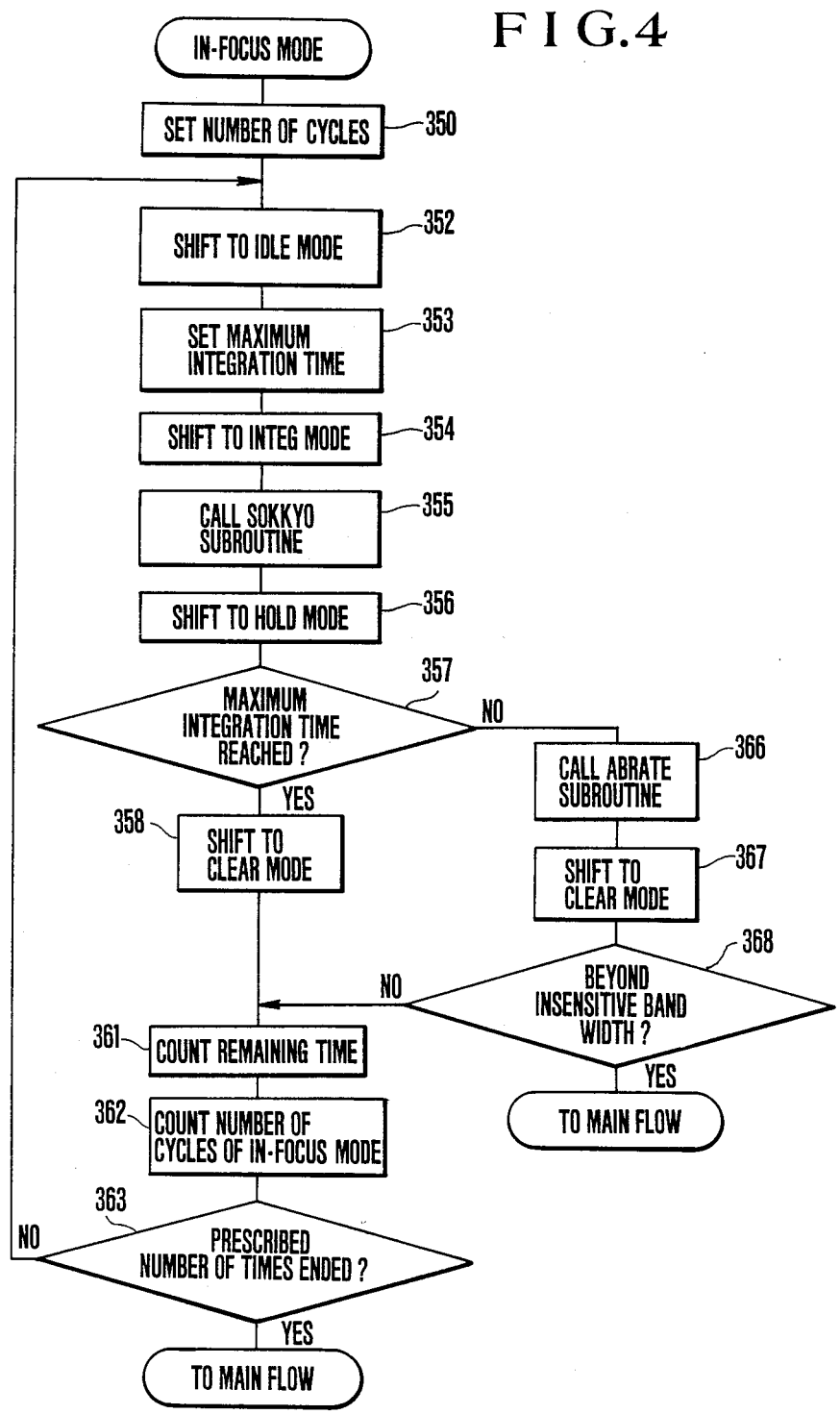
FIG. 4 is a flow chart of the program for the focusing mode.

Returning here to the main flow for automatic focusing of FIG. 3, if the performance of the preceding cycle of range finding operation has resulted in production of an in-focus signal, the step 325 is executed to increase the stability of automatic focusing by altering the insensitive band width and the range of speed control according to the scheme of Table 2. In the next step 326, as has been described in great detail, the speed and direction are then determined based on the value stored in the memory M (RATEM). In order to maintain constant the time it takes to perform any cycle of range finding operation, this time is made equal to the sum of 256 pulses as CLK signal. In the next step 327, therefore, if the in-focus state is attained when n pulses where n is smaller than 256 have been produced, a timer then starts to count the remaining (256-n) pulses. During this counting operation, controlling of the speed in accordance with the duty ratio is simultaneously performed. If the in-focus state is attained in the present cycle of range finding operation is tested again in the next step 328. If not, the flow returns again to the step 305. Subsequently, the next cycle of range finding operation starts. If so, a program for the in-focus mode shown in FIG. 4 is performed. For this case of range finding there is provided another algorithm.

When it is judged in the step 313 that the mean value $(Va+Vb)/2$ is not capable of reaching the threshold level VH in 256 pulses of integration, jump to a step 330 occurs. Here, if the gain of the pre-amplifier 27 is the maximum value is tested. If not, as this implies that the preset value of the gain is 1x or 8x, jump to a step 332 occurs again in which the gain is increased one step, namely, either from 1x to 8x, or from 8x to 64x. After that, when a pulse as MODE signal is produced, HOLD mode transits to CLEAR mode and the integration capacitors 31 are cleared in the next step 333. During the operation of this loop of the steps 332 and 333, the range finding is not allowed to take place because the preset value of the gain is not proper. While preserving the result of the preceding cycle of range finding operation, the flow returns to the step 305 to recycle the range finding operation. It will be appreciated that in this embodiment, the means for preventing the gain from becoming too high in the step 317 and from becoming too low in the step 333 provide assurance of establishing a sufficient dynamic range to perform range finding with high accuracy and reliability.

When the gain has been determined in the step 330 to be the maximum, a step 336 is executed to test if the mean value $(Va+Vb)/2$ reaches the threshold level VL (VL>VH). If not, as this is taken as a lower signal level, the next step 337 follows. In this step, a pulse of MODE signal is produced and CLEAR mode operates. Then, in the next step 338, the motor 50 is given an infinity-pointed signal. Therefore, the photographic lens is moved to effect focusing up to infinity. After that, a program for the infinity mode shown in FIG. 5 is executed. For this case of ranging finding, there is still another algorithm. But, before the infinity mode is started, a step 339 is executed so that to allow for the flow to return from the infinity mode to the step 305 for the normal mode only after $(Va+Vb)/2<VL$ is maintained for more than a prescribed number, $n_0$, of cycles, this number is set to, for example, 10. This is because, if the mean value $(Va+Vb)/2$ is near the threshold level VL, hatching would otherwise take place as the two modes transit to each other alternatively.

When the mean value $(Va+Vb)/2$ has been determined in the step 336 to be in reach to the threshold level VL, as this implies that the signal has so large a level that the range finding can be properly performed, a step 341 is executed to call out the ABRATE subroutine shown in FIG. 13. This subroutine has already been described before. In the next step 342, a pulse as MODE signal is produced to set out CLEAR mode, and the integration capacitors 31 are cleared. In the next step 344, if the in-focus state is attained in the preceding cycle of range finding operation is tested. If not, jump to a step 345 occurs in which the required values of the insensitive band width and the speed control range are determined.

Whilst, as has already been described in connection with the steps 324 and 235, the insensitive band width and the length of the speed control range can be adjusted to any desired values by the suitable design of the program, the ratio of the integration signal to noise called S/N ratio becomes worse as the integration level decreases under the condition that the integrating period is constant. Therefore, the S/N ratio is worse when $VL>(Va+Vb)/2>VH$ than when $(Va+Vb)/2=VH$. If the insensitive band width is fixed to the same value, the range finding operation in a VL zone is caused to become unstable. Hence, for the VL zone, the insensitive band width must be widened. Also, even if the VL zone is the same, the S/N ratio takes largely different values for $(Va+Vb)/2\approx VH$ and $(Va+Vb)/2\approx VL$ from each other. Also, much desired increase of the insensitive band width, though its being advantageous at improvement of the stability of operation, will produce an adverse effect of reducing the accuracy of automatic focus adjustment. Hence, it is of importance to limit the increase of the insensitive band width to a necessary minimum.

Figure 18:
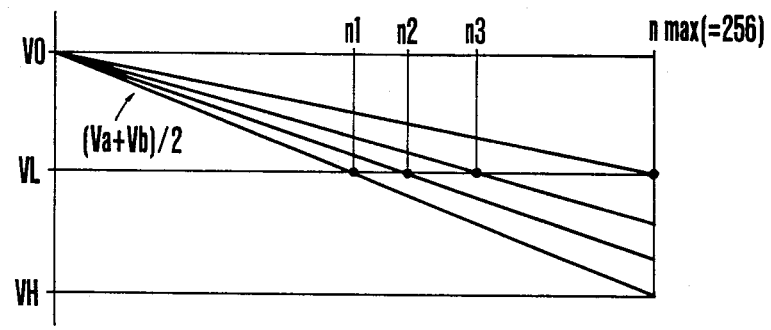
FIG. 18 is a graph taken to explain how to divide the range in order to determine the width of insensitive band, and the width of speed control.

From this reason, in a step 345, as the period during which the maximum number of pulses as CLK signal or 256 pulses are produced is divided into four regions (0 to $n_1$), ($n_1$—$n_2$), ($n_2$—$n_3$) and ($n_3$—256), as shown in FIG. 18, what region the moment at which $(Va+Vb)/2=VL$ is reached falls in is sought to allow for the insensitive band width and the length of the speed control range to be varied as a function of the mean value $(Va+Vb)/2$, as shown in Table 4. Thus, depending on the level of the signal, the insensitive band width is extended with the limitation of its increase to different necessary minima.

TABLE 4

| | F E D C B A 9 8 7 6 5 4 3 2 1 0 |
|---|---|
| (0–$n_1$) |     0          \|     $L_3$     \|    $L_2$    \|    $L_1$    \|    H    \| |
| ($n_1$–$n_2$) |     0          \|     $L_3$     \|    $L_2$    \|    $L_1$    \|    H    \| |
| ($n_2$–$n_3$) |        0       \|     $L_3$     \|    $L_2$    \| $L_1$ \| H \| |
| ($n_3$–256) |        0       \|      $L_3$      \|    $L_2$    \|$L_1$\|H\| |

For note, in this embodiment, as shown in FIG. 18 and Table 4, the VL zone is divided into four regions, and the insensitive band width and the speed control range are altered from region to region. Yet, if the method for specifying each region is to rely on the circuit design, at least three more comparators would have to be used. So, for this embodiment, use is made of the program of the microcomputer 49, wherein the regions are specified by measuring the integration time to $(Va+Vb)/2$ or counting the number of pulses as CLK signal to respective values $n_1$, $n_2$ and $n_3$.

When the preceding cycle of range finding results in the in-focus sate, the step 346 operates to widen the insensitive band width by the method described in connection with the step 335, thereby an improvement of stabilization is achieved. Then, the speed and direction are determined in the next step 347 as has already been described in connection with the step 326. If the present cycle results in the in-focus state in the step 348, the program for the in-focus mode of FIG. 4 is then started. If out of focus, the flow returns to the step 305. Thus, recycling of the range finding operation in the same way continues.

As has so far been described, when the focus state is determined to be sharp, the in-focus mode starts to operate according to the program of FIG. 4. In the in-focus mode, the maximum integration time is shortened to reduce the consumption of electrical power and the insensitive band w largely widened so that the motor 50 can stop stably in the controlled position. Yet, if the in-focus mode operates for a long time, it would result that as the object is moving, the required accuracy of focusing control cannot be insured. Therefore, the number of cycles of range finding operation in the in-focus mode is limited to, for example, 10. After that, the flow is made to return to the step 305 of FIG. 3. After one cycle of range finding operation in the normal mode has been performed, if the in-focus state is detected again, the normal mode is made to transit to the in-focus mode.

In a step 350, information representing the prescribed number of cycles of range finding operation in the in-focus mode, in this instance, a numeral of 10, is put in a memory M (SSTRTM). This memory M(SSTRTM) is set at the start of operation of the in-focus mode. Then, counting down from 10 is carried out. When a change to the out-of-focus state has occurred in the middle of the counting, as the motor 50 is energized again, the remaining value is used for determining a magnitude by which the acceleration is reduced from the prescribed rate for H speed to, for example, $L_1$, $L_2$ or $L_3$ speed. Thus, a smooth acceleration of rotation of the motor 50 is achieved. If that change occurs after the termination of the counting, the acceleration is controlled by the principle described before.

In a step 352 of FIG. 4, the in-focus mode transits to IDLE mode, in which, as has already been described, the offset is automatically adjusted. In the next step 353, as the maximum integration time, for example, 16 in the number of pulses is set in. In the next step 354, IDLE mode transits to INTEG mode. Hence, the clearing is released, and an integration starts. SOKKYO subroutine of FIG. 12 is called out in a step 355 to perform a range finding operation. In the next step 356, INTEG mode transits to HOLD mode wherein the integration outputs Va and Vb are held. If the integration time is determined in a step 357 to have reached the maximum, the range finding operation terminates, and the flow advances to the next step 358 to operate CLEAR mode. The remaining time is then counted down to maintain constant the period of any cycle of range finding operation in a step 361. In the next step 362, the number of cycles of range finding operation performed in the in-focus mode is counted. When this number reaches the prescribed value sensed in a stop 363, the flow returns to the step 305 of FIG. 3. Thus, the range finding is operated in the normal mode again. If, in the step 363, the number is determined to have not reached the prescribed value yet, the step 352 is executed again to recycle the in-focus mode.

In the step 357, if the integration time is determined to have not reached the maximum, as this implies $(Va+Vb)/2=VH$, the insensitive band width is to be widened. That is, jump to a step 366 occurs in which ABRATE subroutine of FIG. 13 is called out to decrease the mean value $(Va+Vb)/2$ in response to ST signal. Then, CLEAR mode is operated in a step 367. In the next step 368, if the thus-decreased mean value falls beyond the insensitive band is tested. If so, the flow returns to the step 305 of FIG. 3 to operate the normal mode of range finding. If not, the step 368 is looped to the step 361.

Next, we explain about the infinity mode by reference to FIG. 5. Here, what type of interchangeable lens is in use is taken into account. In other words, since there are two types, one of which has a switch responsive to reach of the focusing lens at the terminal end for infinity of movement thereof for stopping the motor 50, and another type which has no such switch, two different suitable manners to these types in which it operates selectively must be provided. As has been described before, when the maximum integration time has expired with the result of $(Va+Vb)/2 > VL$, the normal mode of FIG. 3 transits at the step 339 to the infinity mode.

Figure 19:
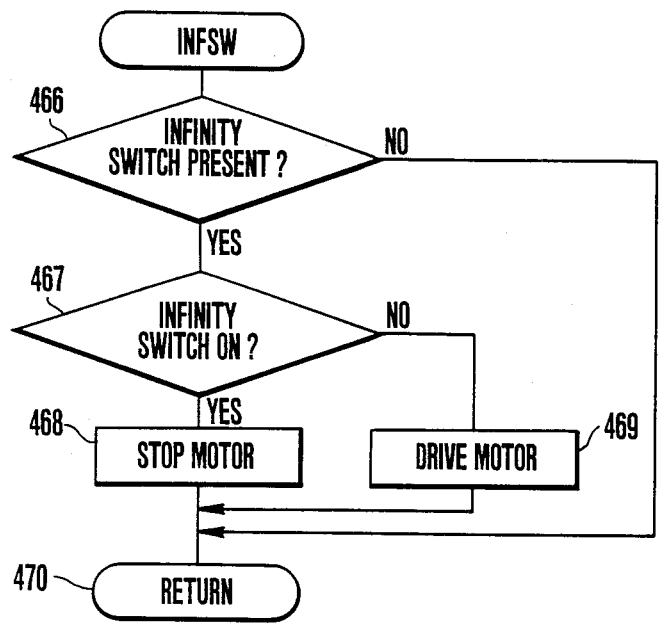
FIG. 19 is a flow chart of INFSW subroutine.

In the first step 369 of FIG. 5, INFSW subroutine shown in FIG. 19 is called out to test if the photographic lens in use has the infinity switch 51. Depending on its result, the control of the motor 50 is changed over between two methods. Previous execution of EIFSW subroutine of FIG. 8 in the step 304 of FIG. 3 has resulted in the storage of 1 in the memory M (INFM) when there is the infinity switch 51, or 0 when not. Hence, in INFSW subroutine, whether or not the infinity switch 51 is present is determined in its first step 466 by reading out the memory M (INFM). If the infinity switch 51 is absent, jump to RETURN step 470 of FIG. 19 occurs. Thus, the infinity mode is immediately switched to its main program.

With the infinity switch 51 in use, the step 466 is followed by the next step 467 in which if it is on is tested. In other words, from the information from the contact 52 of the infinity switch 51, whether or not the photographic lens has been focused to an infinitely distant object with its focusing lens 60 at the corresponding terminal end of movement is examined by sensing the level of an input at the terminal P2. When $P2=0$, the contact of the infinity switch 51 is determined to be on. For this case, the flow advances to the next step 468 in which the current supply to the motor 50 is stopped, and therefrom returns to the main program of the infinity mode of FIG. 5. For $P_2 \neq 0$, since the contact 52 of the infinity switch 51 is off, because, at this time, the focusing lens 60 does not reach the terminal end for infinity of movement yet, a step 469 is executed to continue rotating of the motor 50 in a direction to effect focusing up to infinity, until $P_{2=0}$ is reached.

Figure 20:
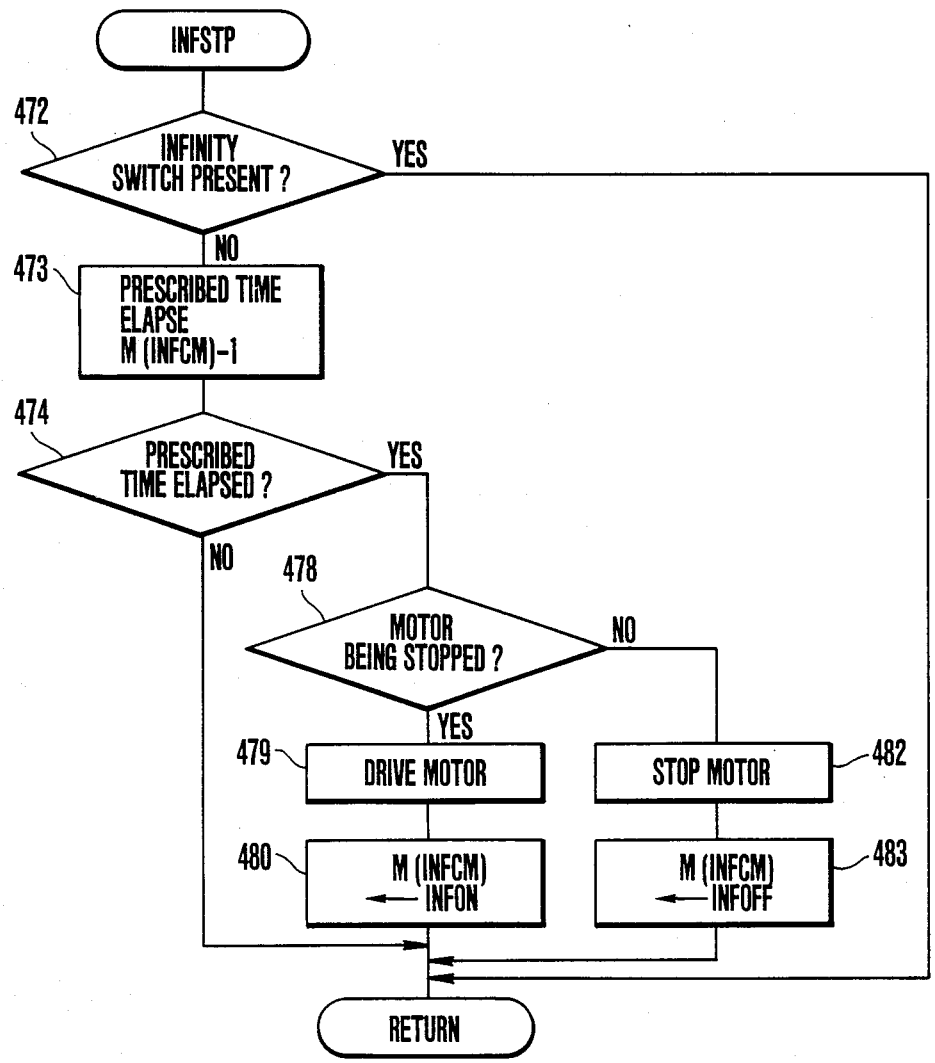
FIG. 20 is a flow chart of INFSTP subroutine.

With no infinity switch 51, when in a step 370, INFSTP subroutine shown in FIG. 20 is called out. In its first step 472, if the infinity switch 51 is absent, or M (INFM)=0, is tested. If not, because, as has been described in connection with the step 369 of FIG. 19, whether the motor 50 is to be stopped or run in the direction to effect focusing up to infinity has been determined by sensing the on or off state of the infinity switch 51, the flow returns to the main program without the necessity of doing any examination and treatment.

If so, a step 473 is executed to examine whether the photographic lens has moved to the terminal end of focusing movement by making use of a software or a program timer. That is, in order to avoid wasteful consumption of electrical power, a certain time long enough for the photographic lens to be capable of reaching the terminal end for infinity of total focusing movement from any position, at most the opposite terminal end for the minimum object distance is defined, and when this time has elapsed, the motor 50 is de-energized. The use of this means alone, however, leads to a problem that when the distance adjusting ring of the photographic lens is manipulated away from the position for infinity to an intermediate position, the focusing is no longer performed automatically. To prevent such a faulty operation from occurring, another time for which the motor 50 is left deenergized is defined. And, after this or second time has elapsed, the motor 50 is re-energized for the above-defined first time.

In the next step 473, therefore, subtraction M (INFCM)-1 is performed to test if the first time has elapsed in a step 474. If not, jump to the program of the infinity mode occurs without doing any treatment.

If so, the motor 50 is changed over between energization and deenergization in a step 478 and those that follow. For this purpose, the memory is read out in the step 478 to determine whether or not the motor 50 is stopping at the present time. If so, the next step 479 is executed to drive the motor 50 in the direction toward infinity. After information representing the above-defined first time INFON has been stored in a timer memory M (INFCM) in the next step 480, the flow returns to the program of the infinity mode. If not, or the motor 50 is determined in the step 478 to be running, as this implies that the motor 50 has actually been energized for the first time INFON, and therefore that the photographic lens lies at the terminal end for infinity of total focusing movement, a stop signal is given to the motor 50 in a step 482. After another information representing the above-defined second time has been stored in the memory M (INFCM) in a step 483, the flow returns to the program of the infinity mode.

By selecting the proper one of the two manners in which the infinity mode, or the motor 50 that unequivocally drives the focusing lens 60, is able to operate, the focusing operation is stabilized regardless of whether or not the interchangeable lens in use is of the type having the infinity switch 51.

Returning again to FIG. 5, we proceed with further explanation of the program for the infinity mode. In steps 372 to 374, if the automatic focusing switch is on or off is tested in a similar way to that described in connection with JDAFSW subroutine of FIG. 9. When this switch is on, a pulse POINT shown in FIG. 10 is produced in a step 375, indicating the start of the sequence of modes. In the next step 376, IDLE mode is operated. Then, a maximum possible integration time for the infinity mode is set by the step 377. This time has a slightly shorter value than that when in the normal mode by, for example, 20 to 40%. Or otherwise, near the equilibrium, frequent switching between the infinity mode and the VL mode takes place due to the influence of noise, making unstable the operation. After the infinity mode has once been started, the stabilization is not broken thanks to the presence of a hysteresis.

The IDLE mode transits to INTEG mode in a step 378. In the next step 379, SOKKYO subroutine of FIG. 12 is called out and executed. The INTEG mode transits to HOLD mode in a step 380, and therefrom to CLEAR mode in the next step 381. If $(Va+Vb)/2=VH$ is then tested in the step 382. If so, as this implies that the photographic situation has changed so that the object distance is finite, the flow returns to the step 305 of FIG. 3 to operate the normal mode.

When $(Va+Vb)/2>VH$ as determined in the step 382, the flow advances to the next step 383 in which if $(Va+Vb)/2<VL$ is tested. If so, the infinity mode should be skipped to return to the step 305 and the range finding operation should be recycled. If this is immediately done, the stabilization is broken from the same reason as that described in connection with the step 377. Only after the maintenance of the condition: $(Va+Vb)/2\leq VL$ for a prescribed number of cycles has been certified, the skipping over the infinity mode is permitted to occur when the flow returns to the step 305. That is, When the number of cycles counted under the condition: $(Va+Vb)/2\leq VL$ has reached the prescribed value sensed in the step 384, the flow returns to the step 305 as has been described before. When not, jump to the step 369 occurs to perform the range finding operation in the infinity mode.

In a step 386, information representing a prescribed number of cycles necessary to shift from the infinity mode to the VL mode is set. In the next step 387, the remaining fraction of the period of the present cycle of range finding is counted in vain. In the next step 388, information representing a prescribed number of times the sequence of steps 390 to 396 is repeated is set. When this number has been counted up, the flow returns from the step 398 to the step 369 again. This is because the insensitive band width is widened to minimize the consumption of electrical power when in the infinity mode and stabilize the operation. In the step 389, a trigger pulse is produced. In the step 390, IDLE mode is operated. In the step 391, a shorter maximum integration time, for example, 16 in the number of pulses, is set. Here, the reason why n=16 in the case of the infinity mode coincides with that set in the step 353 is that the same value of integration time is chosen by chance. They may differ from each other in principle. In the step 392, HOLD mode is operated. In the step 393, SOKKYO subroutine is called out and executed. In the step 394, CLEAR mode is operated. In the step 395, when $(Va+Vb)/2$ is determined to be reached within the maximum integration time or before 16 pulses are produced, the flow immediately returns to the step 305 to recycle the range finding operation. In the step 396, in order to bring the time of one cycle into coincidence, for this case, $256-16=240$ pulses are counted. In the step 397, the number of performed cycles of the step 389 to 396 is counted in the step 397. In the step 398, when that number is determined to have reached a prescribed value, for example, 10, the flow returns to the step 369. In the step 398, when that number is not reached yet, the flow returns to the step 390 to perform the range finding operation in the infinity mode.

Though the foregoing embodiment has been described in connection with the focusing lens, it is to be understood that the same holds even for the zoom members of the photographic lens when zooming.

As has been described above, according to the present invention, when the object distance is infinite, the photographic lens can be moved to, and as soon stopped as possible at, the terminal end of total focusing movement with high accuracy and reliability despite which type of photographic lens is in use with or without the infinity switch, thereby giving an advantage that the motor is prevented from rotating with no effect.

Another advantage arising the focusing control method of the invention is that, because the drive control of the motor is relied on the duty ratio, and this duty ratio is made to vary as a function of the number of cycles of a prescribed program, the system can be constructed in simple form.

What is claimed is:

1. A photographic apparatus operating with selection of a first interchangeable lens having a lens member movable in a prescribed range and equipped with position detector means responsive to attainment of said lens member on one of the terminal ends of said range for producing a position signal and a second interchangeable lens equipped with no position detector means for producing the position signal, comprising:

(a) drive means for driving said movable lens means;
(b) command means for producing an actuating signal for said drive means;
(c) control means, when said first interchangeable lens is in use, responsive to said position signal for stopping the output of said command means, and when said second interchangeable lens is in use, responsive to production of said actuating signal for counting a prescribed time upon attainment to stop said actuating signal.

2. An apparatus according to claim 1, wherein said movable lens member is a focusing lens.

3. An apparatus according to claim 1, wherein said prescribed time is equal to that necessary for said movable lens member to move from one terminal end to the other.

4. An apparatus according to claim 1, wherein said actuating signal is information for focusing said movable lens member on an infinitely distant object.

5. An apparatus according to claim 1, wherein said control means is a microcomputer.

6. A control device for controlling (1) a first movable lens unit in a first lens barrel having position detecting means for outputting a position signal when said first lens unit reaches a predetermined position, and (2) a second lens unit in a second lens barrel having no position detecting means, comprising:

first control means for stopping the movement of the first movable lens in accordance with the position signal; and second control means for stopping the movement of the second movable lens unit after a predetermined period of time from the start of the movement of the first movable lens unit.

7. A control device according to claim 6, wherein said first and second control means are disposed in a microcomputer.

8. A control device according to claim 6, wherein said first and second control means are adapted to stop the movement of respective first and second focusing lens units.

9. A control circuit for controlling a first movable lens unit and a second movable lens unit, comprising:

first control means for stopping the movement of the first movable lens unit when the first lens units reaches an end of a predetermined movement range; and second control means for stopping the second movable lens unit after a predetermined period of time from the start of the movement of the second movable lens unit.

10. A control circuit according to claim 9, wherein said first and second control means are disposed in a microcomputer.

11. A control circuit according to claim 9, wherein said first and second control means are adapted to stop the movement of respective first and second focusing lens units.

* * * * *

UNITED STATES PATENT AND TRADEMARK OFFICE
CERTIFICATE OF CORRECTION

PATENT NO. : 4,876,564

DATED : October 24, 1989

INVENTOR(S) : Takashi Amikura, et al.

It is certified that error appears in the above-identified patent and that said Letters Patent is hereby corrected as shown below:

COLUMN 1:

Line 21, "one." should read --ones.--.

Line 41, "above described" should read --above-described--.

COLUMN 2:

Line 24, "FIG. 10(a)" should read --FIGS. 10(a)--.

Line 49, "photo-currents" should read --photo-currents obtained in the photosensitive elements 21a and 21b--.

COLUMN 3:

Line 55, "the logic circuits 45" should read --the logic circuit 45--.

COLUMN 5:

Line 34, "tion circuits 30" should read --tion circuit 30--.

Line 53, "output" should read --outputs--.

Line 54, "For" should read --Since--.

UNITED STATES PATENT AND TRADEMARK OFFICE
CERTIFICATE OF CORRECTION

PATENT NO. : 4,876,564
DATED : October 24, 1989
INVENTOR(S) : Takashi Amikura, et al.

It is certified that error appears in the above-identified patent and that said Letters Patent is hereby corrected as shown below:

COLUMN 6:

Line 14, "to change" should read --changing--.

Line 57, "testify" should read --test if--.

COLUMN 7:

Line 11, "photograph" should read --photographed--.

COLUMN 8:

Line 29, "to transit" should read --transiting--.

Line 31, "to transit" should read --transiting--.

COLUMN 9:

Line 27, "even for" should read --even when--.

COLUMN 10:

Line 1, "this when" should read --it is--.

Line 29, "is" (first occurrence) should read --being--.

UNITED STATES PATENT AND TRADEMARK OFFICE
CERTIFICATE OF CORRECTION

PATENT NO. : 4,876,564
DATED : October 24, 1989
INVENTOR(S) : Takashi Amikura, et al.

It is certified that error appears in the above-identified patent and that said Letters Patent is hereby corrected as shown below:

COLUMN 11:

Line 2, "means" should read --mean--.

COLUMN 12:

Line 53, "cate," should read --cated,--.

COLUMN 14:

Line 30, "reaches" should read --reach--.

Line 41, "event" should read --occurrence--.

COLUMN 15:

Line 2, "cycle of" should read --cycle, the--.

Line 41, "ranging finding" should read --range finding--.

COLUMN 16:

Line 53, "sate," should read --state,--.

UNITED STATES PATENT AND TRADEMARK OFFICE
CERTIFICATE OF CORRECTION

PATENT NO. : 4,876,564

DATED : October 24, 1989

INVENTOR(S) : Takashi Amikura, et al.

It is certified that error appears in the above-identified patent and that said Letters Patent is hereby corrected as shown below:

COLUMN 17:

Line 1, "band w" should read --band width--.

Line 47, "stop 363," should read --step 363,"

COLUMN 19:

Line 60, "(Va + Vb)/2 < VL" should read --"(Va + Vb)/2 $\leq$ VL--.

Line 63, "from" should read --for--.

COLUMN 20:

Line 48, "as soon stopped" should read --stopped as soon--.

Line 54, "arising" should read --arising from--.

Line 56, "is relied" should read --relies on--.

COLUMN 22:

Line 18, "first lens units" should read --first moveable lens unit--.

UNITED STATES PATENT AND TRADEMARK OFFICE
CERTIFICATE OF CORRECTION

PATENT NO. : 4,876,564

DATED : October 24, 1989

INVENTOR(S) : Takashi Amikura, et al

It is certified that error appears in the above-identified patent and that said Letters Patent is hereby corrected as shown below:

COLUMN 22:

Line 18, "first lens units" should read --first moveable lens unit--.

Signed and Sealed this

Tenth Day of September, 1991

Attest:

HARRY F. MANBECK, JR.

Attesting Officer

Commissioner of Patents and Trademarks